(12) United States Patent
Hyodo et al.

(10) Patent No.: US 11,392,879 B2
(45) Date of Patent: Jul. 19, 2022

(54) OPERATION ESTIMATING METHOD AND OPERATION ESTIMATING SYSTEM

(71) Applicants: KABUSHIKI KAISHA TOSHIBA, Minato-ku (JP); TOSHIBA DIGITAL SOLUTIONS CORPORATION, Kawasaki (JP)

(72) Inventors: Yasuyoshi Hyodo, Ota (JP); Taisuke Yamanaka, Shinjuku (JP); Kazuyoshi Nishi, Suginami (JP)

(73) Assignees: KABUSHIKI KAISHA TOSHIBA, Minato-ku (JP); TOSHIBA DIGITAL SOLUTIONS CORPORATION, Kawasaki (JP)

(*) Notice: Subject to any disclaimer, the term of this patent is extended or adjusted under 35 U.S.C. 154(b) by 226 days.

(21) Appl. No.: 16/440,576

(22) Filed: Jun. 13, 2019

(65) Prior Publication Data

US 2019/0295025 A1 Sep. 26, 2019

Related U.S. Application Data

(63) Continuation of application No. PCT/JP2017/034591, filed on Sep. 25, 2017.

(30) Foreign Application Priority Data

Dec. 16, 2016 (JP) .............................. JP2016-244257

(51) Int. Cl.
*G06Q 30/00* (2012.01)
*G06Q 10/06* (2012.01)
(Continued)

(52) U.S. Cl.
CPC ....... *G06Q 10/06398* (2013.01); *G06F 3/011* (2013.01); *G06F 3/017* (2013.01); *G06F 17/18* (2013.01); *G06Q 10/06* (2013.01)

(58) Field of Classification Search
CPC .. G06Q 10/06398; G06Q 10/06; G06F 3/011; G06F 3/017; G06F 17/18
See application file for complete search history.

(56) References Cited

U.S. PATENT DOCUMENTS

2012/0291544 A1* 11/2012 Kawabe ............... A61B 5/4866
73/488
2014/0247149 A1* 9/2014 Proud .................. A61B 5/0024
340/870.02
(Continued)

FOREIGN PATENT DOCUMENTS

JP 2006-295576 10/2006
JP 2007-206037 8/2007
(Continued)

OTHER PUBLICATIONS

Porzi et al., A Smart Watch-Based Gesture Recognition System for Assisting People With Visual Impairments, Proceedings of the 3rd ACM international workshop on Interactive multimedia on mobile & portable devices, 2013 (Year: 2013).*

(Continued)

*Primary Examiner* — Patricia H Munson
*Assistant Examiner* — Uche Byrd
(74) *Attorney, Agent, or Firm* — Oblon, McClelland, Maier & Neustadt, L.L.P.

(57) ABSTRACT

According to one embodiment, an operation estimating method comprises presetting a plurality of operation candidates to be estimated, acquiring acceleration data from an activity meter worn by a person being measured, calculating estimated probabilities of the operation candidates from the acquired acceleration data, selecting an operation candidate corresponding to a maximum probability from the calculated estimated probabilities, as an estimated operation, and correcting the estimated operation in consideration of a past (Continued)

operation performance when the maximum probability of the estimated probabilities is lower than a predetermined value.

4 Claims, 18 Drawing Sheets

(51) Int. Cl.
*G06F 3/01* (2006.01)
*G06F 17/18* (2006.01)

(56) References Cited

U.S. PATENT DOCUMENTS

2014/0379296 A1* 12/2014 Nathan ............... G06Q 10/08
  702/150
2017/0078418 A1* 3/2017 Pennanen ............ G06N 20/00

FOREIGN PATENT DOCUMENTS

| | | |
|---|---|---|
| JP | 2009-134590 | 6/2009 |
| JP | 2009-217559 | 9/2009 |
| JP | 4550463 B2 | 9/2010 |
| JP | 2013-164748 | 8/2013 |
| JP | 2016-50868 | 4/2016 |
| WO | WO2013/187035 A1 | 12/2013 |
| WO | WO-2013187035 A1 * | 12/2013 ........ H04W 52/0254 |

OTHER PUBLICATIONS

Written Opinion dated Dec. 19, 2017 in PCT/JP2017/034591 filed Sep. 25, 2017.

* cited by examiner

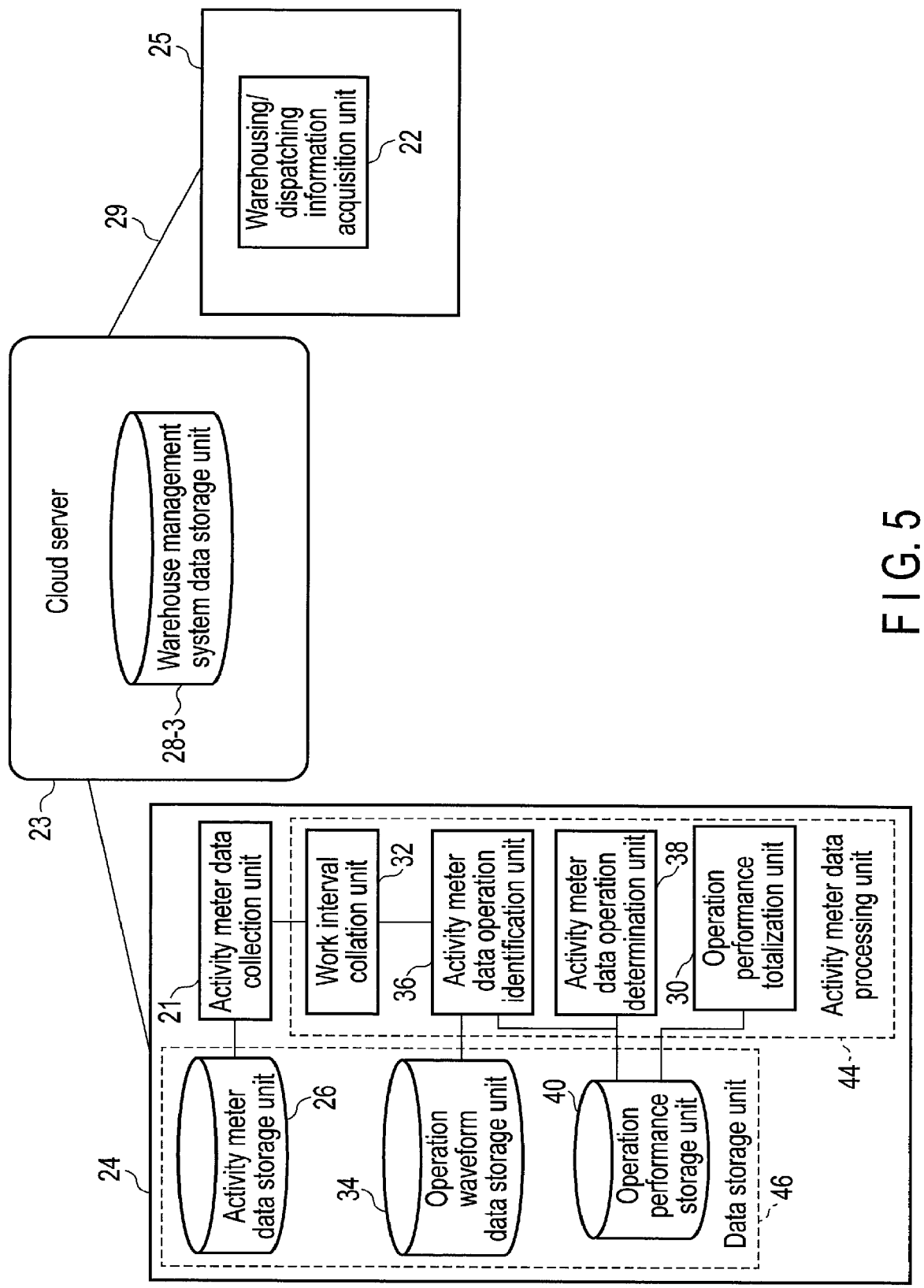
F I G. 5

| Work time | Work content | Work state | |
|---|---|---|---|
| 09:10 | Product1 | Start | —62 |
| 09:14 | Product1 | End | —64 |
| 09:15 | Product1 | Start | —62 |
| 09:18 | Product1 | End | —64 |
| ... | | | |
| 09:30 | Product2 | Start | —62 |
| 09:40 | Product2 | End | —64 |
| ... | | | |
| 10:16 | Product3 | Start | —62 |
| 10:28 | Product3 | End | —64 |
| ... | | | |

50 = Work time, 56 = Work content, 60 = Work state

| $N(Y(k)\|X(k-1))$ | | Y(k) | | | | $\sum_{j=1}^{4} Y(k)j$ |
|---|---|---|---|---|---|---|
| | | A | B | C | D | |
| X(k-1) | A | 5 | 0 | 2 | 0 | 7 |
| | B | 1 | 1 | 2 | 0 | 4 |
| | C | 1 | 3 | 8 | 1 | 13 |
| | D | 0 | 0 | 0 | 0 | 0 |

F I G. 9

| $P(Y(k)\|X(k-1))$ | | Y(k) | | | | $\sum_{j=1}^{4} P(Y(k)j\|X(k-1))$ |
|---|---|---|---|---|---|---|
| | | A | B | C | D | |
| X(k-1) | A | 0.71 | 0.00 | 0.29 | 0.00 | 1.00 |
| | B | 0.25 | 0.25 | 0.50 | 0.00 | 1.00 |
| | C | 0.08 | 0.23 | 0.61 | 0.08 | 1.00 |
| | D | 0.00 | 0.00 | 0.00 | 0.00 | 0.00 |

F I G. 10

| $P(Y(k)\|X(k-1))$ | | Y(k) | | | | $\sum_{j=1}^{4} P(Y(k)j\|X(k-1))$ |
|---|---|---|---|---|---|---|
| | | A | B | C | D | |
| X(k-1) | A | 0.72 | 0.13 | 0.02 | 0.13 | 1 |
| | B | 0.05 | 0.63 | 0.28 | 0.04 | 1 |
| | C | 0.24 | 0.05 | 0.68 | 0.03 | 1 |
| | D | 0.20 | 0.04 | 0.06 | 0.70 | 1 |

FIG. 13

| | | $P(A(16)j\|S(16))$ | $P(A(16)j\|A(15)x=B)$ | $P(A(16)j\|S(16)) \times P(A(16)j\|A(15)x=B)$ |
|---|---|---|---|---|
| A(16)j (j=1~4) | A | 0.4 | 0.05 | 0.020 |
| | B | 0.1 | 0.63 | 0.063 |
| | C | 0.3 | 0.28 | 0.084 |
| | D | 0.2 | 0.04 | 0.008 |

FIG. 14

| N(Y\|X) | | Y(k) | | | |
|---|---|---|---|---|---|
| | | A | B | C | D |
| X(k-1) | A | — | 43 | 14 | 43 |
| | B | 25 | — | 51 | 24 |
| | C | 52 | 25 | — | 23 |
| | D | 50 | 24 | 26 | — |

F I G. 17

OPERATION ESTIMATING METHOD AND OPERATION ESTIMATING SYSTEM

CROSS-REFERENCE TO RELATED APPLICATIONS

This application is a Continuation Application of PCT Application No. PCT/JP2017/034591, filed Sep. 25, 2017 and based upon and claiming the benefit of priority from Japanese Patent Application No. 2016-244257, filed Dec. 16, 2016, the entire contents of all of which are incorporated herein by reference.

FIELD

Embodiments described herein relate generally to an estimating method and an estimating system for estimating an operation of a person being measured using data acquired from various sensors or estimating a state of the environment in which a sensor is placed.

BACKGROUND

Estimating technology using data acquired from various sensors is developing. If the operation achievement of a person being measured (worker) can be grasped automatically and accurately, it is useful to improve work efficiency and improve worker's skill. In addition to this, if the state of work environment related to a person being measured can also be grasped automatically and accurately to optimize the work environment, it is expected to improve work efficiency and increase energy-saving effect.

High precision or reliability is therefore desired for the behavior estimation and state estimation.

The technologies describing in the following Patent Literatures 1 to 4 relate in a part of an operation-estimating method.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 5 is another schematic block diagram showing the system of the present embodiment.

FIG. 9 is a list of actual measurement examples of "the number of cases" concerning the combination of estimating operations of adjacent Lwo time interval numbers.

FIG. 10 is an example of a list of probabilities of occurrence of the combination of estimating operations of adjacent two time interval numbers.

FIG. 13 is another example of the list of probabilities of occurrence of the combination of estimating operations of adjacent two time interval numbers.

FIG. 14 is a list showing the relationship between the occurrence probability and the estimation probability of an estimating operation performed when the time interval number is 16.

FIG. 17 is another list of "the number of cases" where the estimating operations of adjacent two time interval numbers are combined.

DETAILED DESCRIPTION

Figure 1A:
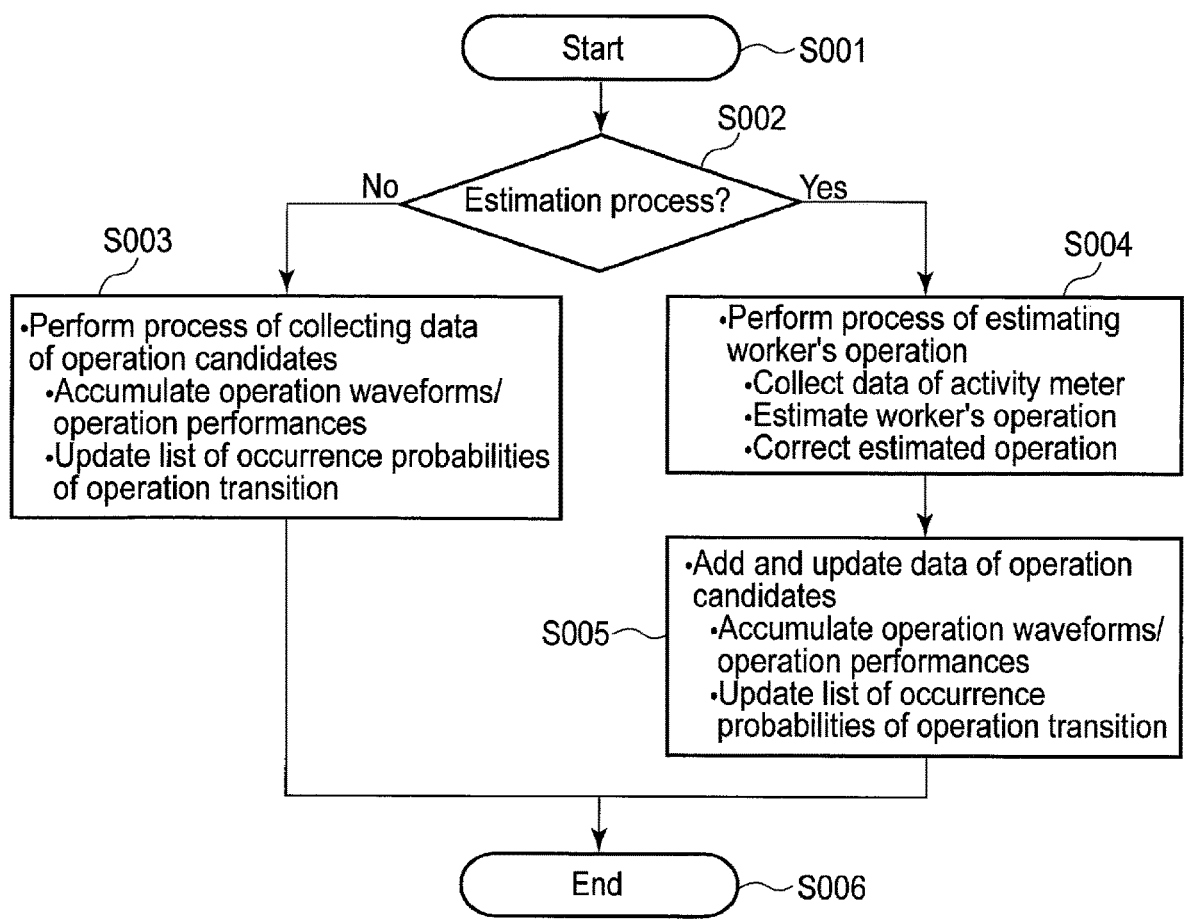
FIG. 1A is a flowchart showing an example of the outline of a process of the present embodiment.

In consideration of the foregoing problem, embodiments described herein aim to provide an estimating method and an estimating system capable of ensuring high estimation accuracy or high estimation reliability.

In general, according to one embodiment, an operation of a person being measured is estimated using sensor data (such as activity meter data acquired from the person being measured). In accordance with the estimated operation, a correction process is performed.

Not only the operation estimation of the person being measured (worker) but also the estimation results of the state of environment around a sensor acquired using the sensor data can also be corrected automatically.

Various embodiments will be described hereinafter with reference to the accompanying drawings. For convenience of descriptions, a method for estimating an operation of a person being measured (worker) using sensor data acquired from an activity meter worn the person being measured will mainly be described here. The method will be described below, taking as an example a case where a three-dimensional acceleration sensor is built in the activity meter to collect acceleration data of three types from three axes orthogonal to each other.

The operation estimation may be performed using data that varies with time, such as video and sound, acceleration and illuminance, without being limited to the above case. Furthermore, the state of environment (e.g., the presence or absence of human beings and animals, the activity states thereof, and illuminance, temperature and humidity conditions) using sensor data acquired from a sensor placed in a fixed location may be estimated. In this state estimation, sensor data that does not vary with time, such as still images may be used.

In the case of transportation/transfer processing in a warehouse to store the limited goods, process operation in the production line of particular products, or the like, the number of work patterns of a worker (person being measured) in a predetermined work environment is limited to a finite number. As specific examples of the work patterns, there are three types of work of "take out goods or products from shelves", "put them on shelves" and "carry them in a dolly". In addition, as an example where a worker transfers a specific product using a dolly, there are four types of work of "move the dolly", "stop it", "carry it without using a dolly" and "manual operation (including loading/discharging work of specific products into/from the dolly)".

In the system of the present embodiment, the operation of a person being measured is assumed to be one reference operation by defining a reference operation to estimate an operation of a person being measured (worker) and calculating similarity between the reference operation and the operation of the person being measured (worker) to be estimated.

The reference operation will be referred to as an operation candidate (or a model operation). For example, regarding the foregoing three types of operation of "take out goods or products from shelves", "put them on shelves" and "carry them in a dolly", operation candidates (model operations) of "take out goods or products from shelves", "put them on shelves" and "carry them in a dolly" are defined in advance. The operation candidates (model operations) are defined by accumulating the achievements of model operations performed by the worker.

FIG. 1A is a flowchart showing an outline of a process in the present embodiment. The estimation method in the present embodiment mainly includes two processes of "a process of collecting data of operation candidate (model operation)" (S003) and "a process of estimating a worker's operation" (S004) based upon the operation candidate (model operation)".

Figure 1B:
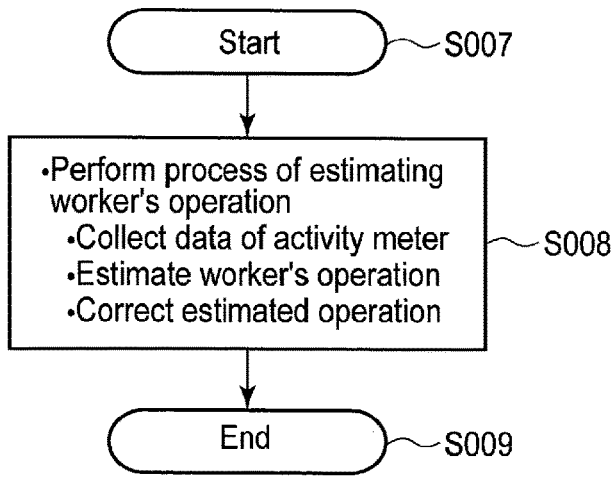
FIG. 1B is a flowchart showing another example of the outline of the process of the present embodiment.

The process in the present embodiment may include only "a process of estimating a worker's operation" (S008) as shown in FIG. 1B, for example. Assume in this case that data of the operation candidate (model operation) for performing the "process of estimating a worker's operation" (S008) is set in advance. Note that the "process of estimating a worker's operation" (S008) is equivalent to the "process of estimating a worker's operation" (S004) shown in FIG. 1A.

The configuration of the process in the present embodiment shown in FIG. 1A may not include only the "process of collecting data of operation candidate" (S003). The configuration shown in FIG. 1A may also not include only "addition and update of data of the operation candidate" (S005).

Hereinafter, the present embodiment will be described in detail on the basis of the example of the outline of the process of the present embodiment shown in FIG. 1A. The examples of the outline of the process shown in FIG. 1B and the outline of the other processes will be described in correspondence with the processes of these examples.

In the present embodiment, as indicated in S003, reference data is accumulated in advance for each preset model operation. The reference data includes acceleration data (corresponding to "accumulation of operation waveforms/operation performances"), which is collected in advance for each preset model operation, as a specific part.

The acceleration data collected in advance will be referred to as reference acceleration data. On the other hand, acceleration data collected from an activity measurement device (activity meter) worn by the person being measured (worker) will be referred to as acquired acceleration data or activity meter data.

The system of the present embodiment estimates an operation of the worker based upon the reference acceleration data (S004). The system of the present embodiment may also estimate the operation of the worker (S004) and update the reference acceleration data using a result thereof (S005) when necessary. The operation of selecting whether to perform the process of S005 may be carried out by user's setting. Alternatively, the operation may be carried out in accordance with the estimation state and the correction state of the "process of estimating a worker's operation" in S004.

Figure 2:
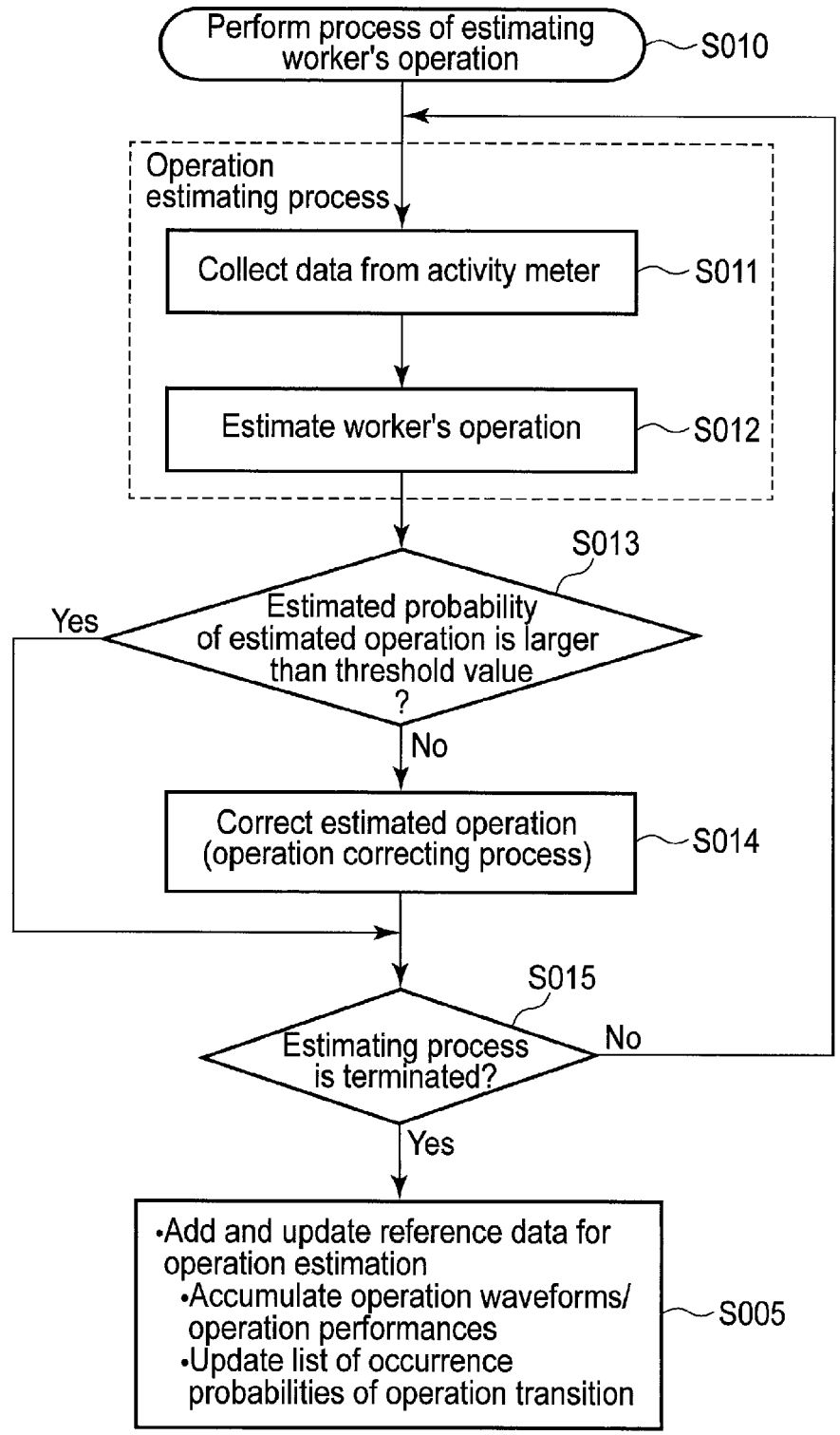
FIG. 2 is a flowchart illustrating the outlines of an operation estimating process and an operation correcting process in the present embodiment.

FIG. 2 shows the "process of estimating a worker's operation" (S004) in detail. The process of estimating a worker's operation is divided into two sub-processes. The first sub-process is an "operation estimating process" and the second sub-process is an "operation correcting process".

The operation estimating process is a process (S012) of comparing acceleration data (S011), which is acquired from the activity meter worn by the person being measured (worker), with the reference acceleration data to estimate a worker's operation.

According to the method of estimating a worker's operation, the acquired acceleration data representing a worker's operation and the reference acceleration data for each model operation collected in advance are compared to express similarity (also referred to as the degree of coincidence) between the worker's operation and each model operation by probability. The probability of the similarity will be referred to as estimated probability. When the estimated probability between the worker's operation and each model operation is calculated, the maximum value of the estimated probability is extracted to estimate the model operation of the maximum value as an operation that has been performed by the worker. This operation will be referred to as an estimated operation.

The estimated probability of the estimated operation that is estimated as a worker's operation may be low. In this case (S013), the accuracy of the estimation of the worker's operation cannot said to be sufficient. In this case, the estimating operation is corrected to correct the estimated operation that is estimated as a worker's operation (S014). In the correcting process, the estimating operation may be performed in consideration of the past operation performance (S014).

The "process of collecting data of operation candidate (model operation)" (S003), "process of estimating a worker's operation" (S004), and "operation estimating process" (S011, S012) and "operation correcting process" (S014) in the "process of estimating a worker's operation" will be described in detail below with reference to the drawings.

Figure 3A:
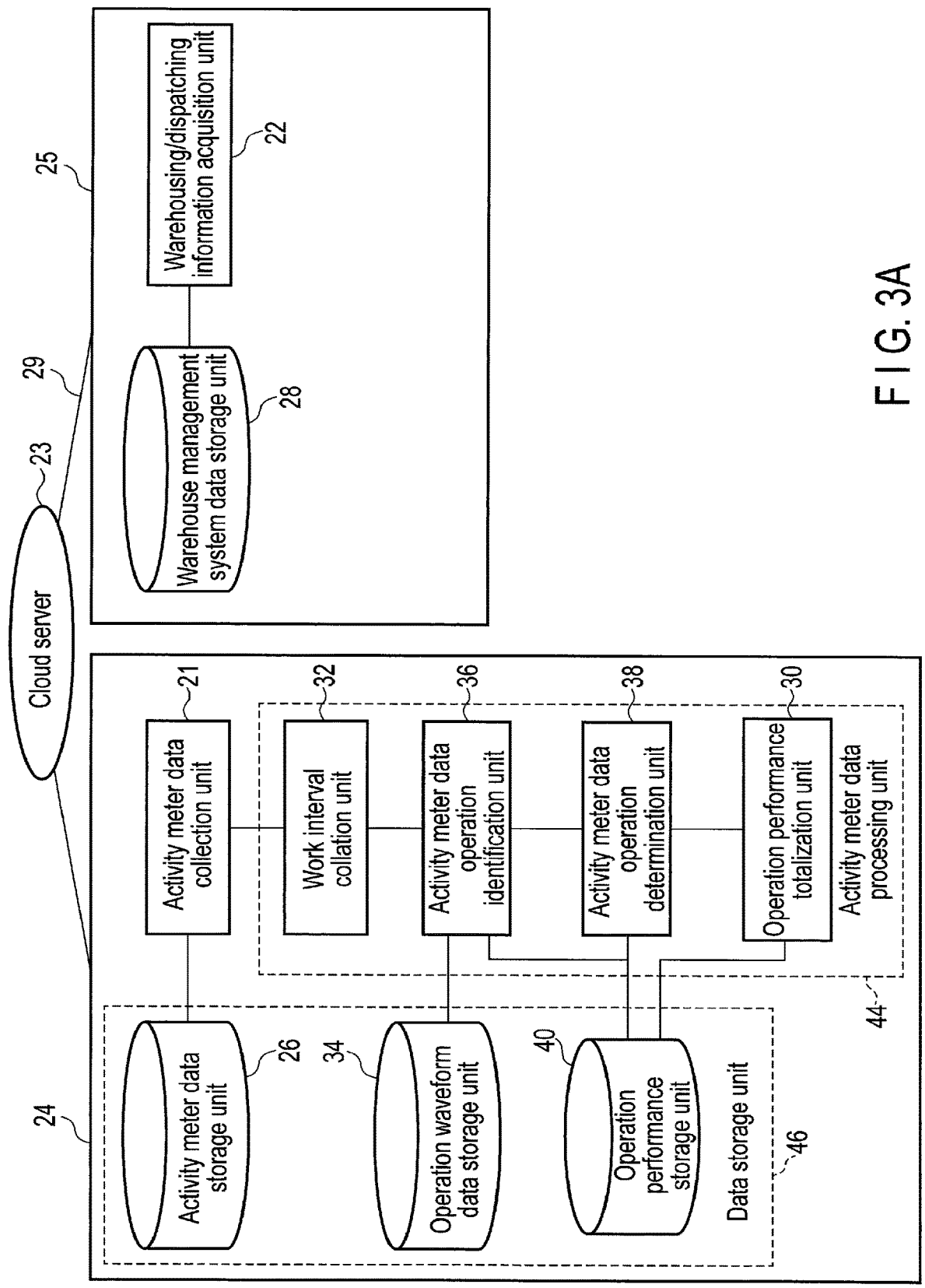
FIG. 3A is a schematic block diagram showing a system of the present embodiment.

FIG. 3A is a schematic block diagram showing the system of the present embodiment. This system is configured by a cloud server 23, a wearable device 24 and a handheld terminal 25. The cloud server 23 and the wearable device 24 can communicate with each other via a network 29, as can the cloud server 23 and the handheld terminal 25.

A worker who works on a work place where a work procedure such as a warehouse operation is determined may hold and use the wearable device 24 and the handheld terminal 25. The wearable device 24 incorporates an activity meter for measuring the activity amount of the worker to make it possible to grasp the status of worker's activity. In each step of the work procedure performed by the worker, data of the progress of each step is input appropriately into the handheld terminal 25.

The system of the present embodiment shown in FIG. 3A is not limited to the above case but may have all other uses. In this case, the worker need not use the handheld terminal 25 and, in other words, it is premised that an activity meter data collection unit 21 is worn by the worker (person being measured). A data storage unit 46 and an activity meter data processing unit 44, which will be described later, may be placed in a fixed position or movably worn by the worker (person being measured). The data storage unit 46 and activity meter data processing unit 44 may also be placed in the cloud server 23.

When the worker works to take, e.g., goods out of the shelf, warehousing/dispatching information of the goods is registered in the handheld terminal 25. The handheld terminal 25 is configured by a warehousing/dispatching information acquisition unit 22 and a warehouse management system data storage unit 28. The warehousing/dispatching information is acquired from the warehousing/dispatching information acquisition unit 22. The acquired warehousing/ dispatching information is stored in the warehouse management system data storage unit 28.

A bar code reader may be applied as a specific example of the handheld terminal 25. In this case, the warehousing/ dispatching information acquisition unit 22 corresponds to a bar code reading unit and the warehouse management system data storage unit 28 corresponds to a storage unit that stores the read barcode information. That is, for example, when the worker acquires warehousing/dispatching information of goods using the handheld terminal 25, the acquired warehousing/dispatching information is stored in the warehouse management system data storage unit 28.

The warehousing/dispatching information stored in the warehouse management system data storage unit 28 includes information items of "work time" that is time when a warehousing/dispatching operation is performed, "work content" that is content of the warehousing/dispatching operation, and "work state" (log) that is a state of the warehousing/dispatching operation.

The "work state" has two information items of "start" indicating the start of work and "end" indicating the end of work. Combining the information items of "work content" and "work time" with the information item of "work state", it is possible to discriminate between the start time and the end time of work corresponding to a predetermined "work content". The interval from start 62 time to end 64 time of a piece of work written in the "work content" is defined as one unit of work (hereinafter referred to as a work interval). The warehousing/dispatching information will be described in detail with reference to FIG. 6.

As will be described later with reference to FIG. 7, the same work interval is divided into one or more time intervals, and time interval number 20 is set for each time interval according to elapsed time 10.

The wearable device 24 is configured by the activity meter data collection unit 21, activity meter data processing unit 44 and data storage unit 46. The activity meter data processing unit 44 is configured by a work interval collation unit 32, an activity meter data operation identification unit 36, an activity meter data operation determination unit 38 and an operation performance totalization unit 30. The data storage unit 46 is configured by an activity meter data storage unit 26, an operation waveform data storage unit 34 and an operation performance storage unit 40. The activity meter data storage unit 26, operation waveform data storage unit 34 and operation performance storage unit 40 may be arranged in different areas on a single memory and arranged on a plurality of different memories.

Activity meter data 72 (acquired acceleration data 12) collected by the activity meter data collection unit 21 is stored in the activity meter data storage unit 26. Also, reference acceleration data is stored in the operation waveform data storage unit 34 for each model operation (operation candidate). The reference acceleration data stored for each model operation is used to identify activity meter data in the activity meter data operation identification unit 36. Then, operation identification data is stored in the operation performance storage unit 40 (its details will be described later).

The activity meter data collection unit 21 incorporates an acceleration sensor to make it possible to collect acceleration corresponding to the operation of a worker (person being measured) who wears the wearable device 24. The activity meter data collection unit 21 stores the acquired acceleration data temporarily in the activity meter data storage unit 26 as the activity meter data 72 (acquired acceleration data 12). Then, the activity meter data collection unit 21 reads the activity meter data 72 (acquired acceleration data 12) which is stored temporarily with proper timing and transfers it to the work interval collation unit 32.

The work interval collation unit 32 identifies the "work interval" with reference to the warehousing/dispatching information stored in the foregoing warehouse management system data storage unit 28.

Note that the warehousing/dispatching information stored in the warehouse management system data storage unit 28 of the handheld terminal 25 may be transferred to the work interval collation unit 32 via the network 29. Alternatively, it may be read directly from the warehouse management system data storage unit 28 as appropriate when the work interval collation unit 32 divides the activity meter data in units of "work interval".

The activity meter data operation identification unit 36 further divides the foregoing "work interval" into "time intervals". In the present embodiment, the operation content of a worker is estimated for each of the "time intervals". That is, each of the "time intervals" is a unit of the operation estimating process to estimate the operation of the worker (person being measured). The "time intervals" may be fixed. In the present embodiment, however, they may be varied appropriately using, for example, a clustering technique, as will be described later with reference to FIGS. 16 to 18. In this case, the activity meter data operation identification unit 36 divides the same work interval into time intervals of an optional length again, using the transferred activity meter data 72 (acquired acceleration data 12). The length of the "time interval" may therefore be changed by a method of estimating the operation content. Note that this time interval is expressed by incrementing the number of each time interval in accordance with a time series when the number of a time interval that starts from the oldest time of the work interval is 1.

The activity meter data operation identification unit 36 compares the acquired acceleration data and the reference acceleration data to calculate the estimated probability for each model operation (operation candidate). As an example of the calculation, the activity meter data operation identification unit 36 may compare the feature amount of the activity meter data (acquired acceleration data) and the feature amount (average, variance, frequency) of the reference acceleration data for each model operation (operation candidate) stored in the operation waveform data storage unit 34 to calculate the estimated probability of each model operation (operation candidate) for the activity meter data in the unit of "time interval".

Patent Literature 1 (JP 2009-134590) discloses an example of a method for estimating an operation of a person being measured (worker). The operation estimating method disclosed in Patent Literature 1 (JP 2009-134590) is intended to improve the accuracy of operation estimation by combining a device for specifying the current location of the person being measured and an activity measurement device (activity meter) worn by the person being measured. However, this technology has no function of increasing the accuracy or reliability of estimation results further. Thus, there is a limit to ensuring the estimation accuracy and reliability.

The method of calculating the estimated probability uses the neural network, the naive Bayes described in Patent Literature 2 (JP 2006-295576) and the like. When the neural network and the naive Bayes described in Patent Literature 2, the length of the "time interval" is unit time. The activity meter data operation identification unit 36 calculates the estimated probability of each model operation for the activity meter data in the time interval whose time interval number is equal to k. Then, the activity meter data operation identification unit 36 selects and extracts the maximum value from the estimated probabilities for the model operations calculated in the time interval whose time interval number is equal to k, and defines the model operation of the value as an estimated operation B(k) in the time interval whose time interval number is equal to k.

When a support vector machine, k-means (see Patent Literature 3 (JP 2013-164748)) or the like is used as a method of calculating the estimated probability, "0" or "1" is output as the output result for each model operation. The activity meter data operation identification unit 36 converts the output result for each model operation into estimated probability, for example, using a sigmoid function and specify the estimated operation N(k) based on a result of the conversion result. In this case, the output one operation is defined as an estimated operation B(k) in the time interval whose time interval number is equal to k.

The activity meter data operation identification unit 36 arranges the estimated operations B(k) in chronological order of the time interval number and stores them in the operation performance storage unit 40.

The activity meter data operation determination unit 38 performs a process of determining whether to correct the estimated operation B(k) determined by the activity meter data operation identification unit 36, using the estimated probability P(B(k)|S(k)) of the estimated operation B(k). The process of determining whether to make the correction and the process flow when the correction is made will be described with reference to FIG. 11.

The operation performance totalization unit 30 reads the estimated operations B(k) arranged in chronological order, which are stored in the operation performance storage unit 40 by the activity meter data operation identification unit 36 as described above, and calculates the number of combinations (also referred to as continuous transition) of the estimated operations B(k) and B(k-1) of adjacent two time-interval numbers for each model operation. The operation performance totalization unit 30 generates an occurrence frequency table (or information of occurrence frequency) using the number of combinations calculated for each model operation. The number of combinations (continuous transition) of the estimated operations B(k) and B(k-1) of adjacent two time-interval numbers is called an occurrence frequency.

The operation performance totalization unit 30 uses the occurrence frequency to further calculate occurrence probability that is the probability at which the events of the occurrence frequency occur and generate an occurrence probability table. The operation performance totalization unit 30 stores the generated occurrence frequency table and occurrence probability table in the operation performance storage unit 40. The occurrence frequency and occurrence probability will be described in detail with reference to FIGS. 9 and 10.

Figure 3B:
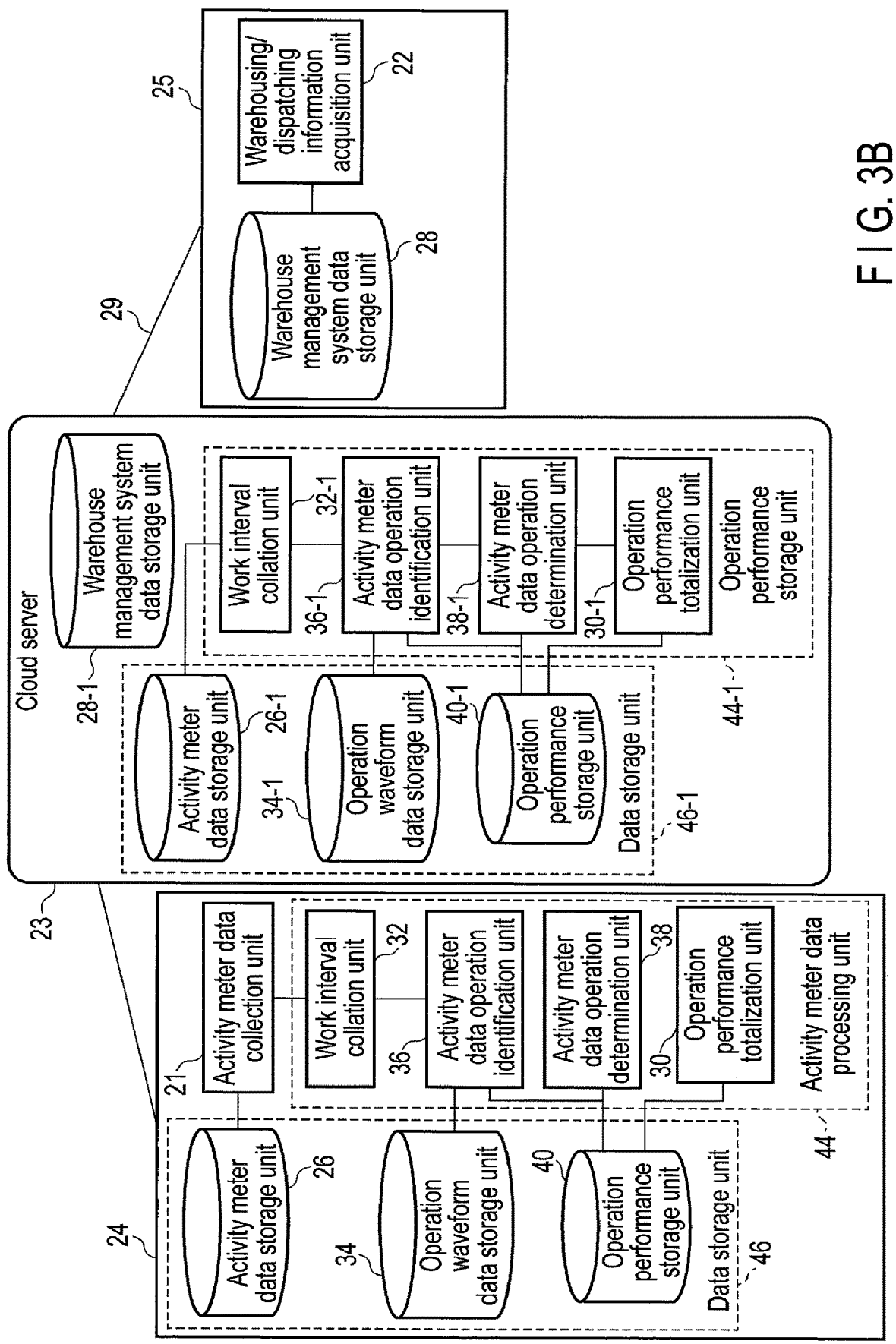
FIG. 3B is another schematic block diagram showing the system of the present embodiment.

FIG. 3A shows an example of the case where the wearable device 24 includes the activity meter data processing unit 44 and data storage unit 46 and the handheld terminal 25 includes the warehouse management system data storage unit 28. However, for example, as shown in FIG. 3B, the functions corresponding to the activity meter data processing unit 44 and data storage unit 46 of the wearable device 24 and the warehouse management system data storage unit 28 of the handheld terminal 25 are held in the cloud server 23 as an activity meter data processing unit 44-1, a data storage unit 46-1 and a warehouse management system data storage unit 28-1. In this case, when there is a large amount of data to be processed, it is considered that the activity meter data collection unit 21 transfers the data to the cloud server 23, and the activity meter data processing unit 44-1 and data storage unit 46-1 in the cloud server 23 process a corresponding data item. Similarly, when there is a large amount of data to be processed, it is considered that the warehousing/dispatching information acquisition unit 22 transmits the data to the cloud server 23, and the warehouse management system data storage unit 28-1 in the cloud server 23 stores a corresponding data item. If, furthermore, the data acquired by the warehousing/dispatching information acquisition unit 22 or the data acquired by the activity meter data collection unit 21 is managed on the server side, data items of different workers can be managed collectively and the acquired data can be utilized effectively. If, for example, the data collected in the activity meter data collection unit 21, which is stored in the acceleration data storage unit 26 and the data of the operation performance storage unit 40 in which the estimated operation and the like are stored, are stored in the cloud server 23, data items of a large number of workers can be accumulated, which becomes useful in improving the accuracy of future operating estimation of the workers.

Figure 4:
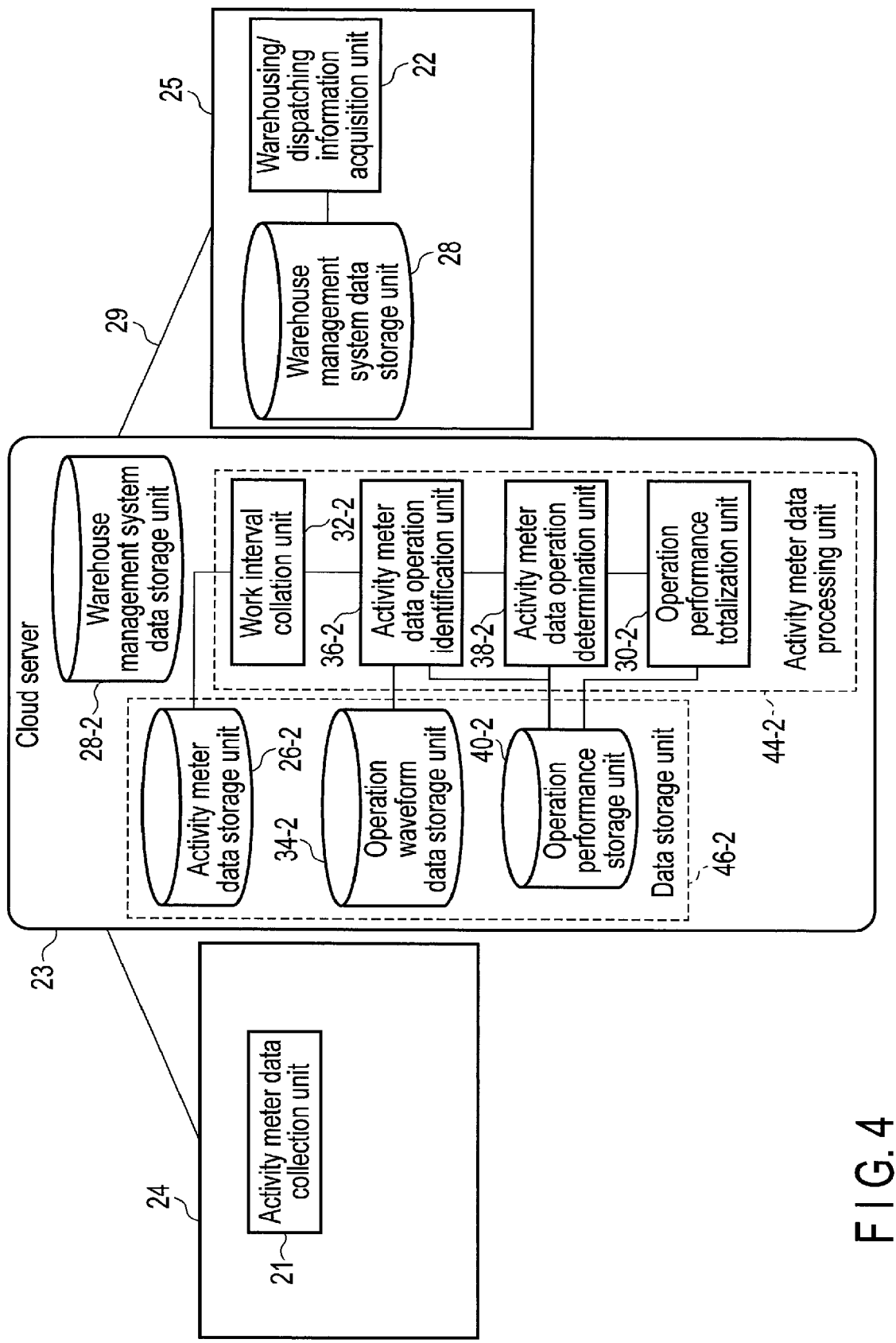
FIG. 4 is another schematic block diagram showing the system of the present embodiment.

In addition, the wearable device 24 may not include the activity meter data processing unit 44 or the data storage unit 46 inside. Instead of these units, an activity meter data processing unit 44-2 and a data storage unit 46-2 may be included in the cloud server 23, as shown in FIG. 4. In this case, the acquired acceleration data collected by the activity meter data collection unit 21 in the wearable device 24 is transferred to an activity meter data storage unit 26-2 in the cloud server 23 via the network 29.

Alternatively, as shown in FIG. 5, the handheld terminal 25 may not include the warehouse management system data storage unit 28 inside, but may include a warehouse management system data storage unit 28-2 in the cloud server 23 in place of the storage unit. In this case, the warehousing/dispatching information collected by the warehousing/dispatching information acquisition unit 22 in the handheld terminal 25 is transferred to a warehouse management system data storage unit 28-3 in the cloud Server 23 via the network 29.

Alternatively, the wearable device 24 may not include the activity meter data processing unit 44 or the data storage unit 46 inside or the handheld terminal 25 may not include the warehouse management system data storage unit 28 inside, but they may be included in the cloud server 23 as an activity meter data processing unit 44-3, a data storage unit 46-3 and the warehouse management system data storage unit 28-2. Alternatively, the wearable device 24 may include the activity meter data processing unit 44 and the data storage unit 46 only in the cloud server 23, and the handheld terminal 25 may include the warehouse management system data storage unit 28 only in the cloud server 23.

Figures 6, 7:
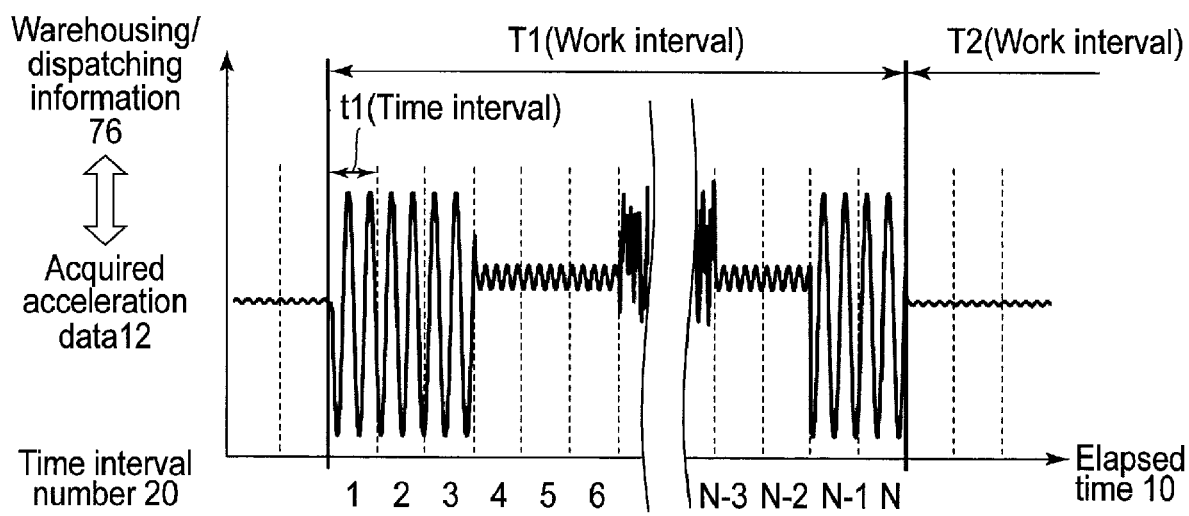
FIG. 6 is a diagram showing an example of warehousing/dispatching information.
FIG. 7 is a diagram showing an example of division between "work interval" and "time interval".

FIG. 6 shows an example of the warehousing/dispatching information stored in the warehouse management system data storage unit 28. The warehousing/dispatching information to be registered using the handheld terminal 25 includes information of "work time 50" indicating time when warehousing/dispatching work was done, "work content 56" indicating the content of the warehousing/dispatching work and "work state 60" indicating the state of the warehousing/dispatching work. The vertical direction of FIG. 6 represents a time axis. In the horizontal direction thereof, the "work time 50", "work content 56" and "work state 60" indicating the content of one item of warehousing/dispatching information (hereinafter referred to as warehousing/dispatching information unit) are placed.

For example, as an example of the warehousing/dispatching information unit described in one line, the "work time 50" is 09:10, product 1 corresponds to the "work content 56" and the "work state 60" specifically means "start 62 (of work)". As the warehousing/dispatching information unit described in the next row below, the "work time 50" is 9:14, the "work content 56" corresponds to product 1 and the "work state 60" specifically means "end 64 (of work)".

Referring to the warehousing/dispatching information unit as described above, it is possible to identify a work interval (one unit of work) defined by the start 62 and end 64 of work for one product. That is, the interval of time from the start 62 to end 64 of the work state 60 corresponding to the same product is one work interval.

In the example of FIG. 6, the warehousing/dispatching information unit includes information of "work time", "work content" and "work state", but it may include any other information. The "work interval" is determined based upon the "work time 50", "work content 56" and "work state 60", but it may be determined in consideration of other information added to the warehousing/dispatching information unit. For example, the "work interval" may be defined in consideration of the "attendance status" of the workers. Using starting time/quitting time as "attendance status", an interval from the starting time to the quitting time may be defined as a work interval. When the working hours in the morning is set from 9:00 am to 11:50 am, an interval from 9:00 am that is the start time of the working hours to 11:50 am that is the end time thereof in the morning may be defined as the work interval.

The function blocks of the present system have been described with reference to FIG. 3A. Below is a description of a specific example of the flow of a process of the system of the present embodiment.

First, the flow of "process of estimating a worker's operation" that is a first large process will be described. In the "process of estimating a worker's operation", the "operation estimating process" that is a first sub-process is performed first, and then the "operation correcting process" that is a second sub-process is performed in accordance with a result of the operation estimating process. The flow of "operation estimating process" that is a first sub-process will be first described.

The wearable device 24 measures the activity amount of a worker by the activity meter data collection unit 21 built therein, and stores the acquired acceleration data, which is a measurement result, in the sequential activity meter data storage unit 26.

The "process of estimating a worker's operation" is started when the work interval collation unit 32 identifies the "work interval" using the acquired acceleration data stored in the activity meter data storage unit 26 and the warehousing/dispatching information stored in the warehouse management system data storage unit 28.

FIG. 7 shows that the acquired acceleration data is divided into "work intervals", and each of the "work intervals" is divided into "time interval" units.

The work interval collation unit 32 divides the acquired acceleration data 12 into "work intervals" using warehousing/dispatching information 76. In the example of FIG. 7, the interval of T1 is a work interval. Then, the work interval collation unit 32 transmits the activity meter data extracted within the range of work interval T1 to the activity meter data operation identification unit 36. The activity meter data operation identification unit 36 further divides the transmitted activity meter data of the "work interval" unit into "time interval" units that are units for estimating the content of the worker's operation. In FIG. 7, t1 (time interval) is an example of a time interval.

In the time interval whose time interval number is equal to k, furthermore, the activity meter data operation identification unit 36 calculates the estimated probability of each model operation (operation candidate) for the activity meter data and identifies the estimated operation B(k) as the operation of time interval number that is equal to k, using the estimated probability.

Figure 8:
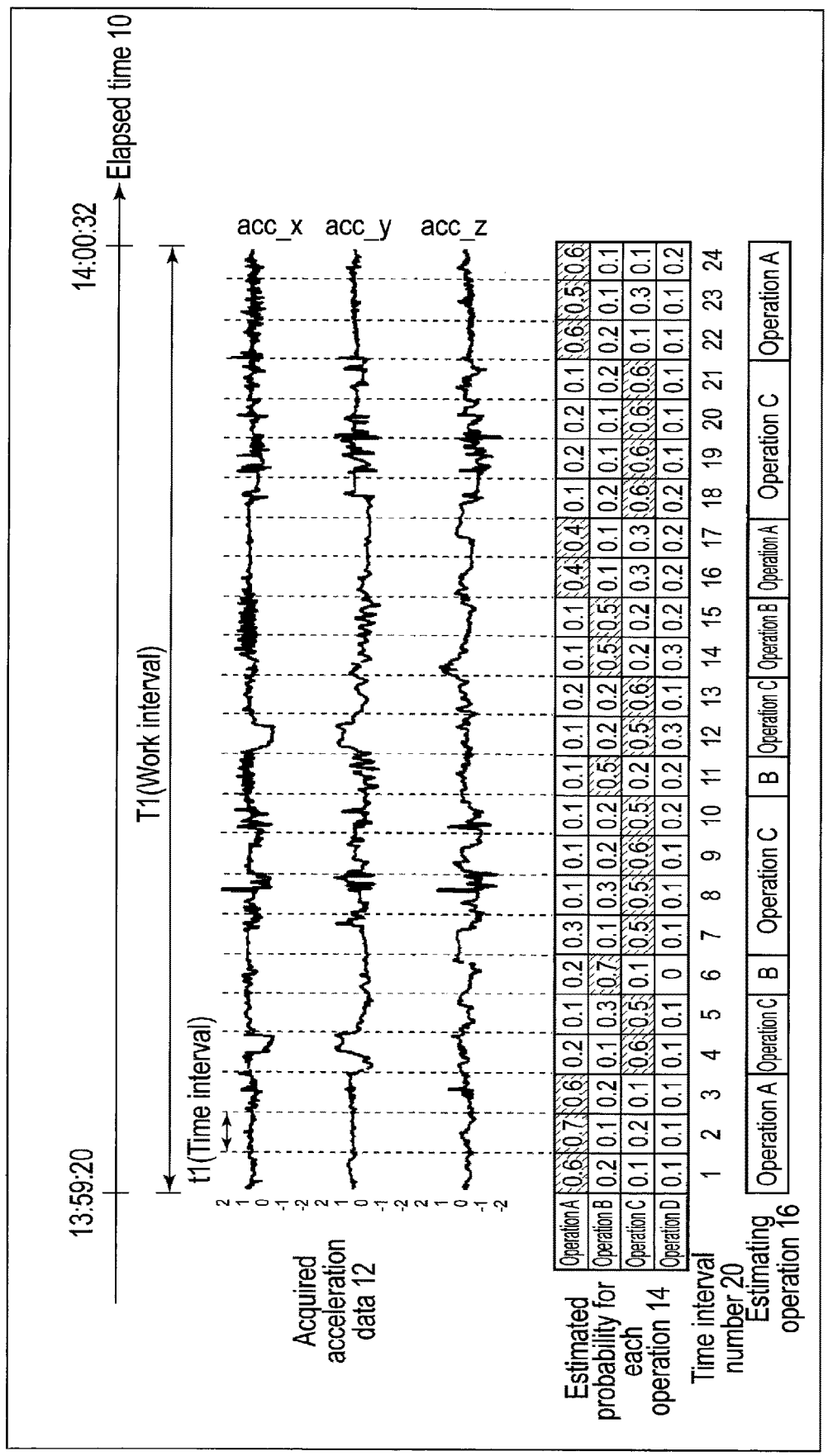
FIG. 8 is a diagram showing an example of an estimating operation performed for each "time interval".

FIG. 8 shows that in the time interval whose time interval number is equal to k, the activity meter data operation identification unit 36 calculates the estimated probability of each model operation for the activity meter data to identify the estimated operation B(k) in the time interval. In this example, the model operation includes four operations of operation A, operation B, operation C and operation D. In the time interval whose time interval number is equal to k, the activity meter data operation identification unit 36 calculates the estimated probability for each model operation for the activity meter data. The results calculated by the activity meter data operation identification unit 36 are shown in estimated probability 14 for each model operation. For example, in the time interval whose number is equal to 1, the estimated probability of operation A is 0.6 and that of operation B is 0.2.

Then, the activity meter data operation identification unit 36 extracts the maximum value from the estimated probabilities of model operations in each time interval and defines the operation of the value as the estimated operation B(k). In the example of FIG. 8, the maximum value in the estimated probabilities of model operations in the time interval number whose number is equal to 1 is 0.6, and the operation of this value is operation A. Thus, the activity meter data operation identification unit 36 defines operation A as the estimated operation B(1) in the time interval whose number is equal to 1.

Similarly, in all the time intervals, the activity meter data operation identification unit 36 extracts the maximum value from the estimated probabilities of model operations for the activity meter data and repeats the process to identify the estimated operation B(k). In the example of FIG. 8, therefore, the estimated operation B(k) (k=1 to 24) in each time interval in the work interval T1 is AAACCBCCCCBCCB-BAACCCCAAA as indicated by the estimated operation 16. The activity meter data operation identification unit 36 stores the extracted estimated operation A(k) (k=1 to 24) in the operation performance storage unit 40 in chronological order. The "operation estimating process" has just been completed.

Then, the wearable device performs the "operation correcting process" that is the second sub-process.

First, the occurrence probability of combination of the estimated operations of adjacent two time interval numbers used in determining whether to perform the "operation correcting process" will be described using a specific example.

As described above as the process contents of the operation performance totalization unit 30, the operation performance totalization unit 30 reads the estimated operations B(k) arranged in chronological order and stored in the operation performance storage unit 40 and calculates the occurrence probability based upon the occurrence frequency that is the number in the case of the combination of estimated operations B(k-1) and B(k) of adjacent two time interval numbers.

When the estimated operations B(k) arranged in chronological order and stored in the operation performance storage unit 40 are read to generate an occurrence frequency table as shown in FIG. 9 and an occurrence probability table as shown in FIG. 10, the estimated operation of time interval number k-1 corresponding to the vertical axis is expressed by X(k-1) and the estimated operation of time interval number k corresponding to the horizontal axis is expressed by Y(k).

FIG. 9 shows an example of an occurrence frequency table listing the occurrence frequency that is the number of combinations of estimated operations X(k-1) and Y(k) of adjacent two time interval numbers in the work interval T1 in the example of FIG. 8. The vertical axis 82 represents the type of estimated operation in the time interval whose number is equal to k-1, and the horizontal axis 84 represents the type of estimated operation in the time interval whose number is equal to k. For example, when the vertical axis 82 represents operation A and the horizontal axis 84 also represents operation A, the time interval number is 2, 3, 17, 23 and 24 in B(k) of the example of FIG. 8. In this case, the number is 5.

$\Sigma Y(k)i$ 86 (i=1 to n) represents the total 86 of cells in the horizontal direction in operation X(k-1) of the vertical axis 82. For example, in the case where the operation X(k-1) of the vertical axis 82 is operation A, the number is 5 when the horizontal axis 84 is operation A, the number is 0 when it is operation B is 0, the number is 2 when it is operation C and the number is 0 when it is operation D. The total $\Sigma Y(k)i$ (i=1 to 4) of these numbers is therefore equal to 7. Here, Y(k)i indicates a case where the type of the estimated operation on the horizontal axis is i=1, i=2 from the left.

If the number in the case of the combination of estimated operations of adjacent two time interval numbers of estimated operation B(k) is calculated, the occurrence probability of the combination of estimated operations of adjacent two time interval numbers of estimated operation B(k) can be calculated. A method of calculating the occurrence probability will be described below.

FIG. 10 shows an example in which the occurrence probability at which the combination of estimated operations of adjacent two time interval numbers occurs, which is calculated based upon the number in the case shown in FIG. 9, is listed as an occurrence probability table. The vertical axis 92 represents the type of estimated operation when the time interval number is equal to k-1, and the horizontal axis 94 represents the type of estimated operation when the time interval number is equal to k. Each of the values in the table is obtained by dividing its corresponding value of the combination of the vertical and horizontal axes in FIG. 9 by $\Sigma Y(k)i$ 86. For example, when the vertical axis 92 is operation A and the horizontal axis 94 is operation A, 0.71 is obtained by dividing the value of number 5 in the case where the vertical axis 82 is operation A and the horizontal axis 84 is operation A in FIG. 9 by $\Sigma X1=7$. It is thus possible to calculate occurrence probability P(Y|X) in the case of performing operation Y after operation X.

The process flow of a correcting process for estimated operation B(k) performed by the activity meter data operation determination unit 38 will be described using the occurrence probability of the combination of estimated operations of adjacent two time interval numbers calculated in the above process. Note that the process of the process flow shown in FIG. 11 employs the neural network or naive Bayes described above as a method of calculating the estimated probability.

The flow of "operation correcting process" that is the second sub-process will be described using the occurrence probability described above.

Completing the "operation estimating process" that is the first sub-process, the activity meter data operation determination unit 38 starts to perform the "operation correcting process".

Figure 11:
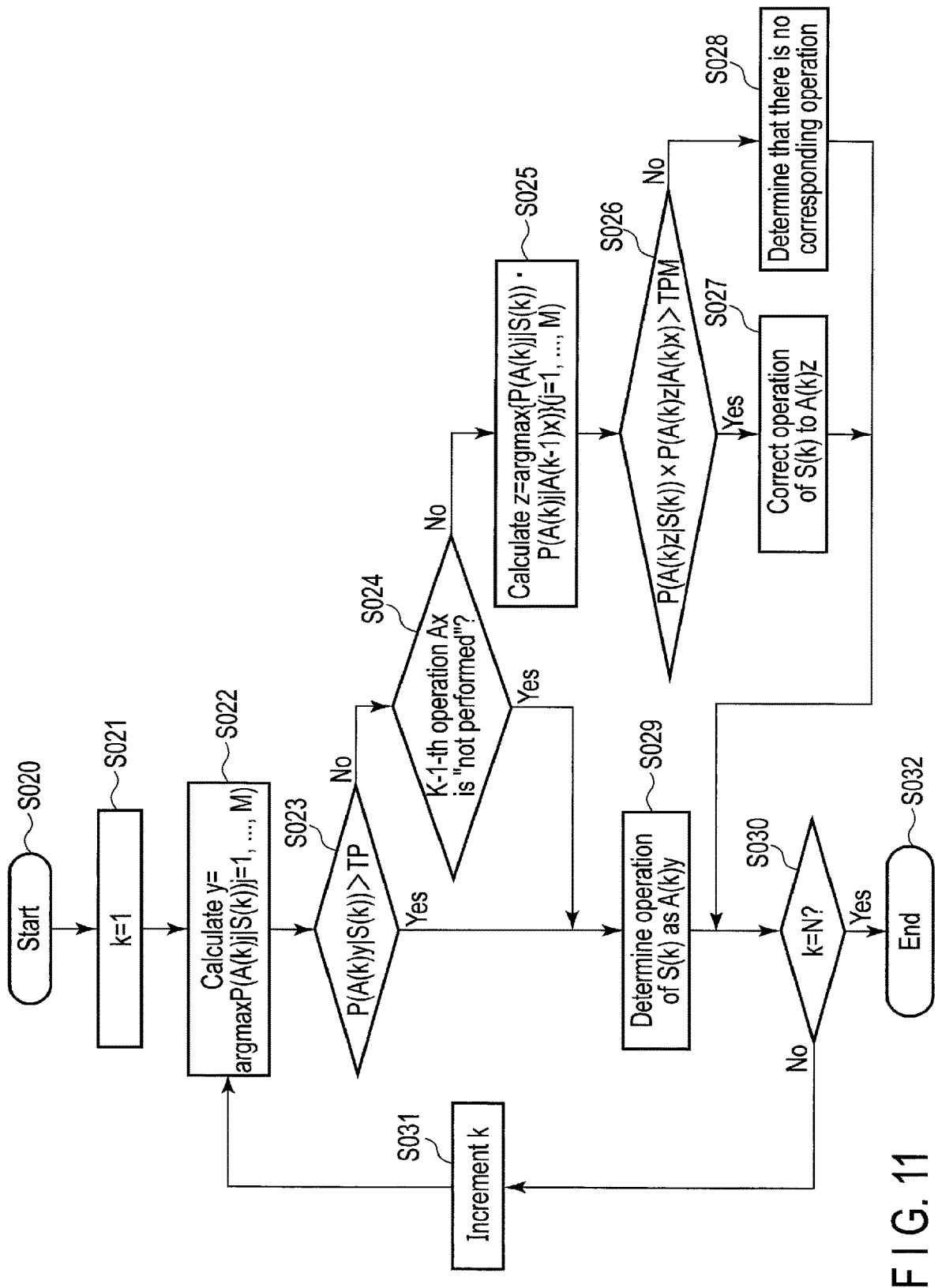
FIG. 11 is a flowchart of a correction propriety determination process and a correction process.

FIG. 11 shows a process flow of the "operation correcting process" including a process of determining whether to correct estimated operation B(k) and a process of the correction in the activity meter data operation determination unit 38 in the system of the present embodiment shown in FIG. 3A.

S(k) represents the acquired acceleration data of the time interval whose number is equal to k in a work interval to be determined. A(k)j (j=1, M) represents the type of a model operation to be estimated (operation candidate to be estimated) by the activity meter data operation identification unit 36 in the time interval whose number is equal to k. P(A(k)j|S(k)) represents the estimated probability of model operation A(k)j in the time interval whose number is equal to k. Therefore, $\Sigma P(A(k)j|S(k))$ (j=1, ... M) represents the sum of the estimated probabilities of all model operations in the time interval whose number is equal to k, and the following is satisfied: $\Sigma P(A(k)j|S(k))=1$ (j=1, M). Taking the time interval whose number is equal to 1 in FIG. 8 as an example, the operation indicated by A(1)j includes the following four types: A(1)1=operation A, A(1)2=operation B, A(1)3=operation C, and A(1)4=operation D. In addition, estimated probability P(A(1)j|S(1)) includes the following: P(A(1)1|S(1))=0.6, P(A(1)2|S(1))=0.2, P(A(1)3|S(1))=0.1, and P(A(1)4|S(1))=0.1. The sum of these estimated probabilities is as follows: P(A(1)1|S(1)) P(A(1)2|S(1))+P(A(1)3|S(1))+P(A(1)4|S(1))=0.6+0.2+0.1+0.1=1.0.

When the activity meter data operation determination unit 38 starts a determination process (S020), it sets 1 as the initial value to a determination target time interval whose number is equal to k (S021). Then, the activity meter data operation determination unit 38 reads estimated probability P(A(k)j|S(k)) (j=1, M) of the model operation stored in the operation waveform data storage unit 34, extracts the maximum value from the read M data items, and identify the operation A(k)y of the maximum value (S022). Note that the operation A(k)y coincides with the estimated operation B(k) extracted by the activity meter data operation identification unit 36. In the process of S022, therefore, the estimated operation B(k) of the time interval whose number is equal to k may be replaced by the process extracted from the operation performance storage unit 40.

Referring then to P(A(k)y|S(k)) that is the estimated probability of estimated operation A(k)y, the magnitude of the estimated probability is compared with that of threshold value TP (S023). When P(A(k)y|S(k)) is larger than TP as a result of the comparison, the activity meter data operation determination unit 38 determines estimated operation A(k)y as an operation in the time interval whose number is equal to k (S029).

When P(A(k)y|S(k)) is equal to or smaller than TP as a result of the comparison, the activity meter data operation determination unit 38 continues to perform a process of determining whether to correct the operation of the time interval whose number is equal to k from the A(k)y.

The threshold value TP may optionally be set by a user. The value may also be changed automatically according to the tendency of the value of the estimated probability of the estimated operation.

The estimated operation in the time interval whose number is equal to k-1, which is precedent to the time interval whose number is equal to k where the activity meter data operation determination unit 38 is currently performing a process, is defined as estimated operation A(k-1)x. The activity meter data operation determination unit 38 reads, from the operation performance storage unit 40, occurrence probability P(A(k)j|A(k-1)x) at which the combination of estimated operations of time intervals whose numbers are equal to k-1 and k occur, in which estimated operation A(k-1)x is performed and the estimated operation of operation A(k)j(j=1, M)) is performed when each operation A(k) j(j=1, M) is regarded as an estimated operation. The activity meter data operation determination unit 38 calculates M data items of P(A(k)j|S(k))×P(A(k)j|A(k-1)x) (j=1, M) using occurrence probability P(A(k)j|A(k-1)x) in the time interval whose number is equal to k and estimated probability P(A(k)j|S(k)) of each operation, and extracts the maximum value from the calculated M data items. The activity meter data operation determination unit 38 identifies operation A(k)z of the extracted maximum value extracted (S025). When there is no estimated operation in the time interval whose number is equal to k-1, which is precedent to the time interval k that is currently determined, that is, when A(k-1)x is not present (S024), the operation of the time interval whose number is equal to k is defined as the estimated operation A(k)y identified in S022 (S029). For example, when k is 1 of the initial value, there is no time interval k-1; thus, the activity meter data operation determination unit 38 determines "the k1-th operation A(k)x is 'not performed'" in S024 as Yes. The flow moves to the process of S029.

The activity meter data operation determination unit 38 compares the magnitude of threshold TPM and that of the value of P(A(k)z|S(k))×P(A(k)z|A(k-1)x) using the operation A(k)z specified from A(k)j (i=1, M) in S025 (S026). When P(A(k)z|S(k))×P(A(k)z|A(k-1)x) is larger than TPM as a result of the comparison, the activity meter data operation determination unit 38 corrects the operation in the time interval whose number is equal to k to A(k)z (S027). With the foregoing process, the activity meter data operation determination unit 38 can correct the operation in the time interval whose number is equal to k, which is specified in S022, from the estimated operation A(k)y to A(k)z.

Note that the threshold value TP may optionally be set by a user. The value may also be changed automatically according to the tendency of the value of the estimated probability of the estimated operation.

When P(A(k)z|S(k))×P(A(k)z|A(k-1)x) is equal to or smaller than TPM as a result of the comparison, the activity meter data operation determination unit 38 determines that there is no operation corresponding to the time interval whose number is equal to k (S028).

While there is a time interval in which a process of determining an operation in the time interval whose number is equal to k has not been completed, the activity meter data operation determination unit 38 repeats determining the need for correction of the estimated operation and performing a correcting process as necessary for each time interval, according to the time series of the time interval (S030). When there is no time interval in which a process of determining the need for correction, the activity meter data operation determination unit 38 terminates the process (S032). With the foregoing process, the estimated operation A(k)y is corrected if necessary. The operation of performing the correcting process and finally determining it as an operation in the time interval whose number is equal to k is called a correcting operation. The relationship between the estimating operation and the correcting operation will be described using a specific example of the estimated probability of a model operation for each time interval number.

Figure 12:
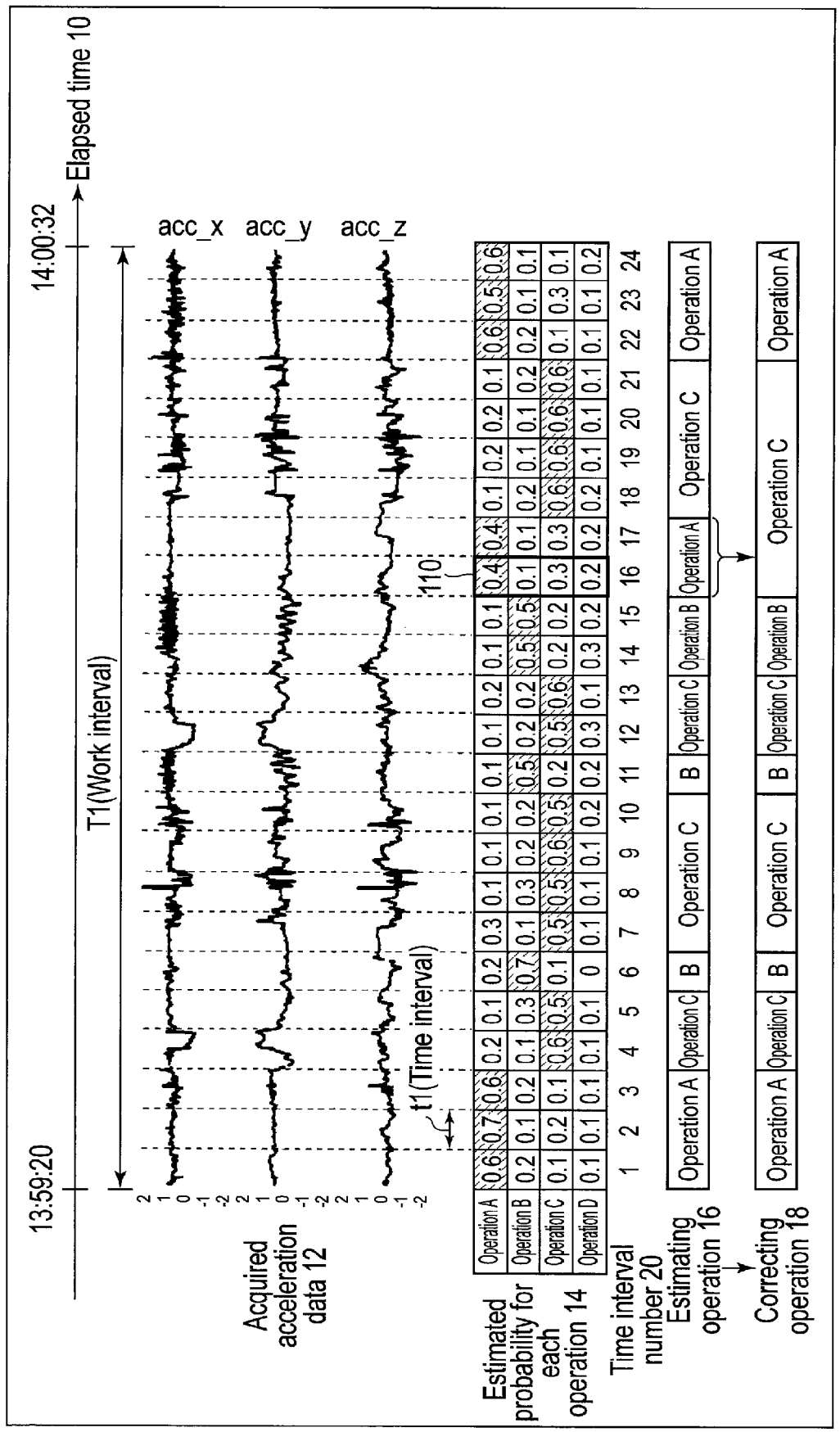
FIG. 12 is a diagram showing an example of the relationship between an estimating operation and a correcting operation based upon a specific example of estimation probability of a model operation.

FIG. 12 shows the relationship between the estimated operation and the corrected operation based upon a specific example of the estimated probability of a model operation for each time interval number. The value of TP in S023 in the process flow of the activity meter data operation determination unit 38 shown in FIG. 11 may be set to 0.5 and the value of TMP in S206 may be set to 0.01. Pay attention here to the time interval whose number is equal to 16 and the time interval whose number is equal to 17. The time intervals whose numbers are equal to 16 and 17 are examples where operation A that is the estimated operation is corrected to operation C. The process flow of correcting the estimated operation in the time intervals whose numbers are equal to 16 and 17 will be described based upon a specific example of, e.g., the estimated probability of the estimated operation.

Like FIG. 10, FIG. 13 shows an example of a list of occurrence probabilities at which the combination of estimated operations of adjacent two time interval numbers occurs. The vertical axis 102 represents the type of estimated operation when the time interval number is equal to k-1, and the horizontal axis 104 represents the type of estimated operation when the time interval number is equal to k. If the time interval number is equal to 16, its immediately preceding estimated operation is operation B. Accordingly, the occurrence probability of the next operation in which operation B is performed is extracted. In FIG. 13, a thick frame 108 represents the occurrence probability of a target to be extracted.

FIG. 14 shows a list of the value of P(A(16)j|S(16)) (j=1, ... 4), the value of P(A(16)j|A(15)x=B) (j=1, M) and the value of P(A(16)j|S(16))×P(A(16)j|A(15)x) when the process of P(A(16)j|S(16))×P(A(16)j|A(15)x=B) (j=1, ... 4) of S025 is performed in the time interval whose number is equal to 16. The value of P(A(16)j|S(16)) (j=1, M) is the estimated probability for each model operation in the interval of the time interval whose number is equal to 16 shown in FIG. 12, and the value of column 122 in FIG. 14. The value of P(A(16)j|A(15)x=B) (j=1, ... 4) is the occurrence probability at which the estimated operation A(15)x in the time interval whose number is equal to 15 is operation B, the value in the thick frame 108 which is operation B of the X axis of the occurrence probability shown in FIG. 13, and the value of column 124 shown in FIG. 14. The value of P(A(16)j|S(16))×P(A(16)j|A(15)x), which is the product of values of columns 122 and 124, corresponds to the value of column 126 shown in FIG. 14. The activity meter data operation determination unit 38 reads the values of columns 122 and 124 shown in FIG. 14 from the operation performance storage unit 40 and multiplies the values together to make it possible to calculate the following: z=argmax {P(A (16)j|S(16)×P(A(16)j|A(15)x=B) (j=1, ... 4)}=0.084.

The activity meter data operation determination unit 38 performs a process of S026 using the calculated value z of 0.084. Since TPM is set to 0.01, the activity meter data operation determination unit 38 determines that the determination process of S026 is correct. The flow moves to the process of S027. In S027, the activity meter data operation determination unit 38 determines operation C with a value of "z=0.084" as an operation in the time interval whose number is equal to 16.

The same process is also performed in the time interval whose number is equal to 17, and the operation in the time interval whose number is equal to 17 is determined as operation C.

As described above, operation A of the estimated operation in the time intervals whose numbers are equal to 16 and 17 is corrected to operation C as shown in FIG. 12. The estimated operation 16 is therefore corrected to a corrected operation 18.

The activity meter data operation determination unit 38 may accumulate the corrected operations determined as described above in the operation performance storage unit 40 and accumulate only the operations in the time interval where the estimated operation is corrected in the operation performance storage unit. When the activity meter data operation determination unit 38 stores the operation in the time interval where the estimated operation is corrected, it may also store the acquired acceleration data together.

Figure 15:
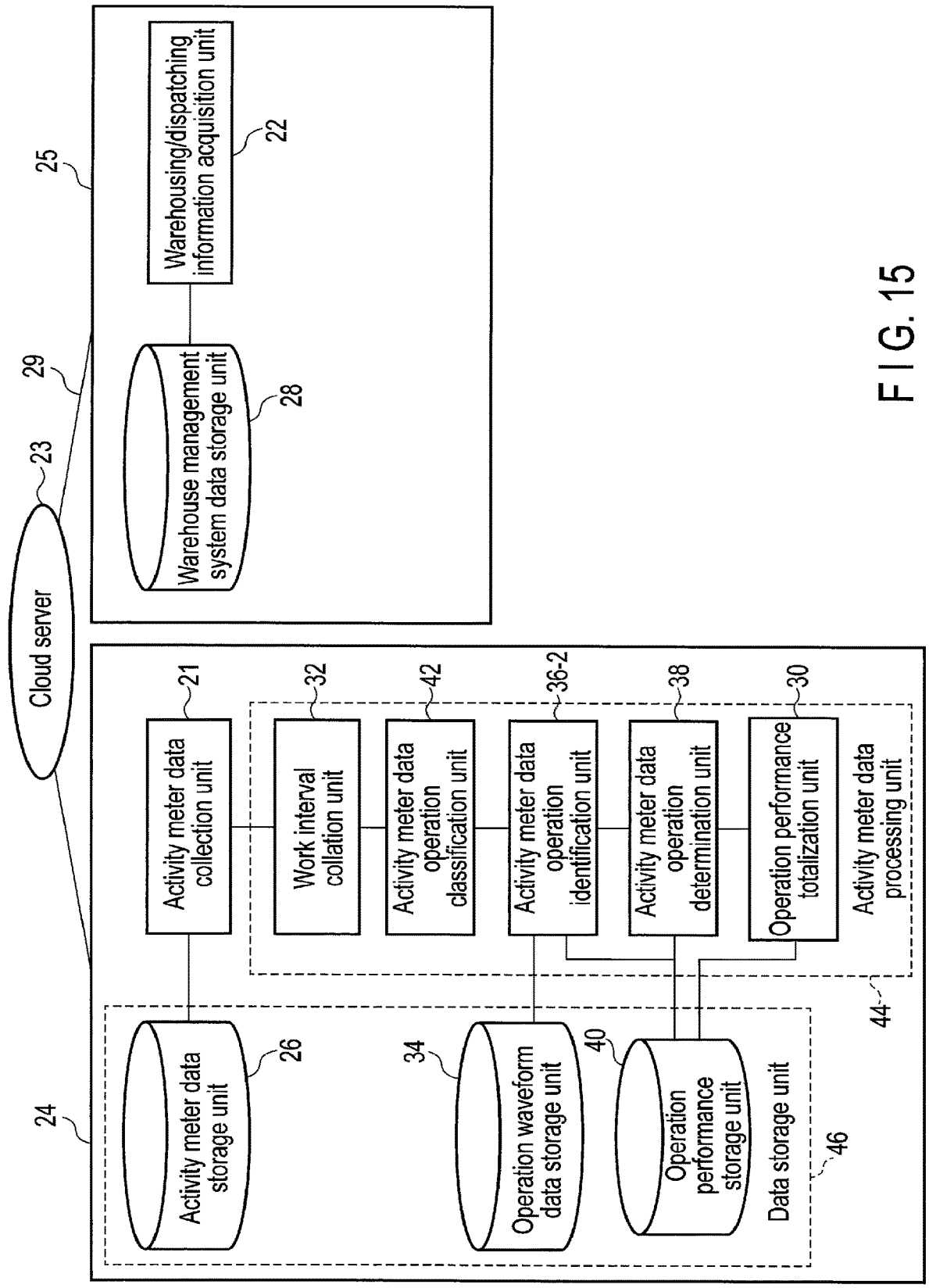
FIG. 15 is a schematic block diagram showing another application example of the system of the present embodiment.

FIG. 15 is a schematic block diagram showing another application example of the system of the present embodiment. The system of FIG. 15 differs from that of FIG. 3A in that an activity meter data operation classification unit 42 performs a process of dividing activity meter data into "time interval" units, which is included in the process of dividing activity meter data into "time interval" units and a process of calculating estimated operation B(k) in the "time interval" units, which are performed by the activity meter data operation identification unit 36 shown in FIG. 3A.

The work interval collation unit 32 shown in FIG. 15 identifies the "work interval" by referring to the warehousing/dispatching information and divides the activity meter data in the range of the work interval using the identified "work interval" and extracts it. The work interval collation unit 32 transmits the extracted activity meter data to the activity meter data operation classification unit 42.

The activity meter data operation classification unit 42 further divides the transmitted activity meter data of the "work interval" unit into "work interval" units that are units to estimate the operation contents of a worker using the clustering method. Note that Patent Literature 4 (JP 2007-206037) discloses various algorithms of the clustering process.

When the "work interval" is defined in the activity meter data operation classification unit 42, the activity meter data operation identification unit 36 calculates the estimated probability of each operation in each time interval using the information of the defined "work interval" to identify the estimated operation B(k) of the corresponding time interval.

Figure 16:
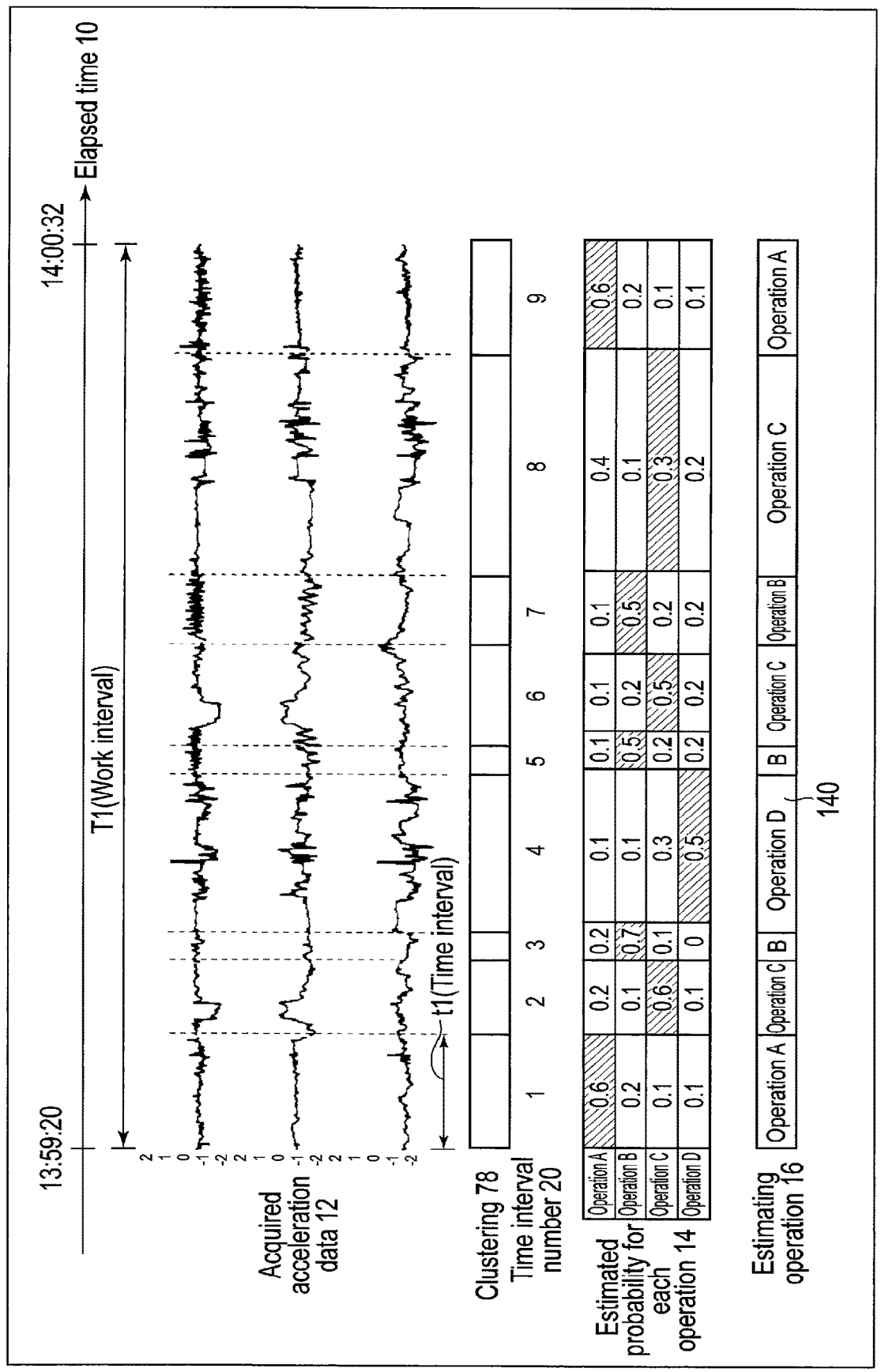
FIG. 16 is a diagram showing another example of specifying an estimating operation performed for each "time interval".
Figure 18:
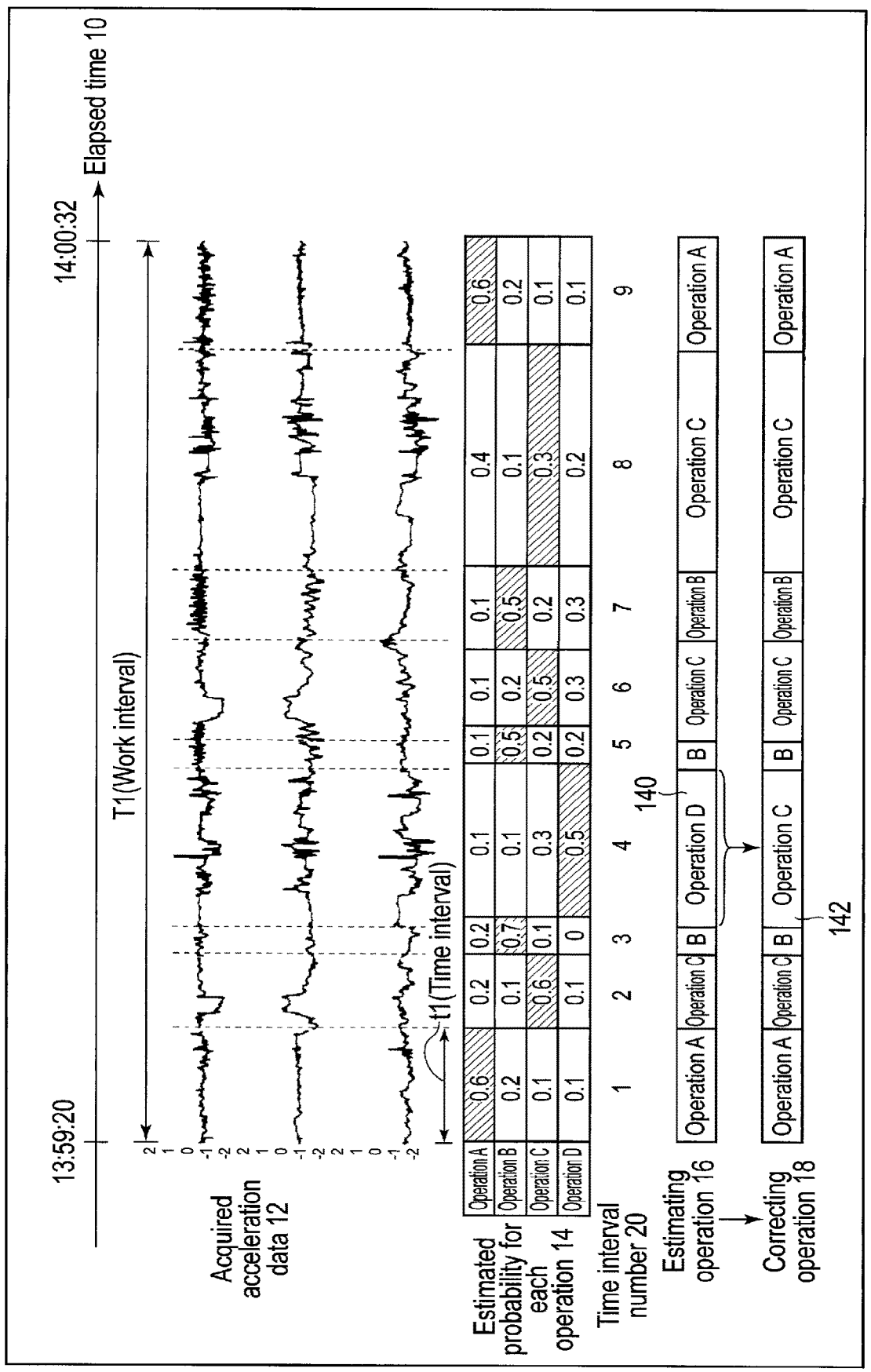
FIG. 18 is a diagram showing another example of the relationship between an estimating operation and a correcting operation based upon a specific example of estimation probability of a model operation.

FIG. 16 shows another example where the activity meter data operation identification unit 36 calculates the estimated probability of each model operation for activity meter data in the number of a time interval to identify the estimated operation B(k) of the time interval, as in FIG. 18.

For example, when the time interval number is 1, the estimated probability of operation A is 0.6, that of operation B is 0.2, that of operation C is 0.1 and that of operation D is 0.1. The activity meter data operation identification unit 36 extracts the maximum value 0.6 from among these estimated probabilities and assumes its model operation, or operation A to be the estimated operation B(1). Similarly, the activity meter data operation identification unit 36 repeats the process of extracting the maximum value from among the estimated probabilities of model operations in time intervals to estimate the estimated operation A(k). Accordingly, in the example of FIG. 16, the estimated operation B(k) (k=1 to 9) of each time interval in the work interval T1 becomes ACBDBCBCA. The activity meter data operation identification unit 36 stores the extracted estimated operation B(k) (k=1 to 9) in the operation performance storage unit 40 in order of time interval number.

The operation performance totalization unit 30 reads the estimated operations B(k) arranged in the order of time interval number from the operation performance storage unit 40, calculates the occurrence probability at which the combination of model operations of adjacent two time interval numbers occurs, and stores the occurrence probability in the operation performance totalization unit 30. The method of calculating the occurrence probability is the same as in the embodiment shown in FIG. 3A.

FIG. 17 shows another example of a list of the number of combinations of estimated operations of adjacent two time interval numbers, as in FIG. 9. The vertical axis 132 represents the type of operation in the time interval whose number is equal to k-1 and the horizontal axis 134 represents the type of operation in the time interval number. For example, the number is 43 when the vertical axis 132 represents operation A and the horizontal axis 134 represents operation B.

FIG. 18 shows the relationship between the estimated operation and the corrected operation based upon a specific example of the estimated probability of a model operation (operation candidate) when TP is set to 0.5 and TMP is set to 0.01, as in FIG. 12. The process to be performed by the activity meter data operation determination unit 38 is a process flow shown in FIG. 11. With this process, for example, operation D that is the estimated operation of the time interval whose number is 4 is corrected to operation C.

Next is a description of the "process of collecting data of operation candidates (model operations)" which is a second large process.

Figure 19:
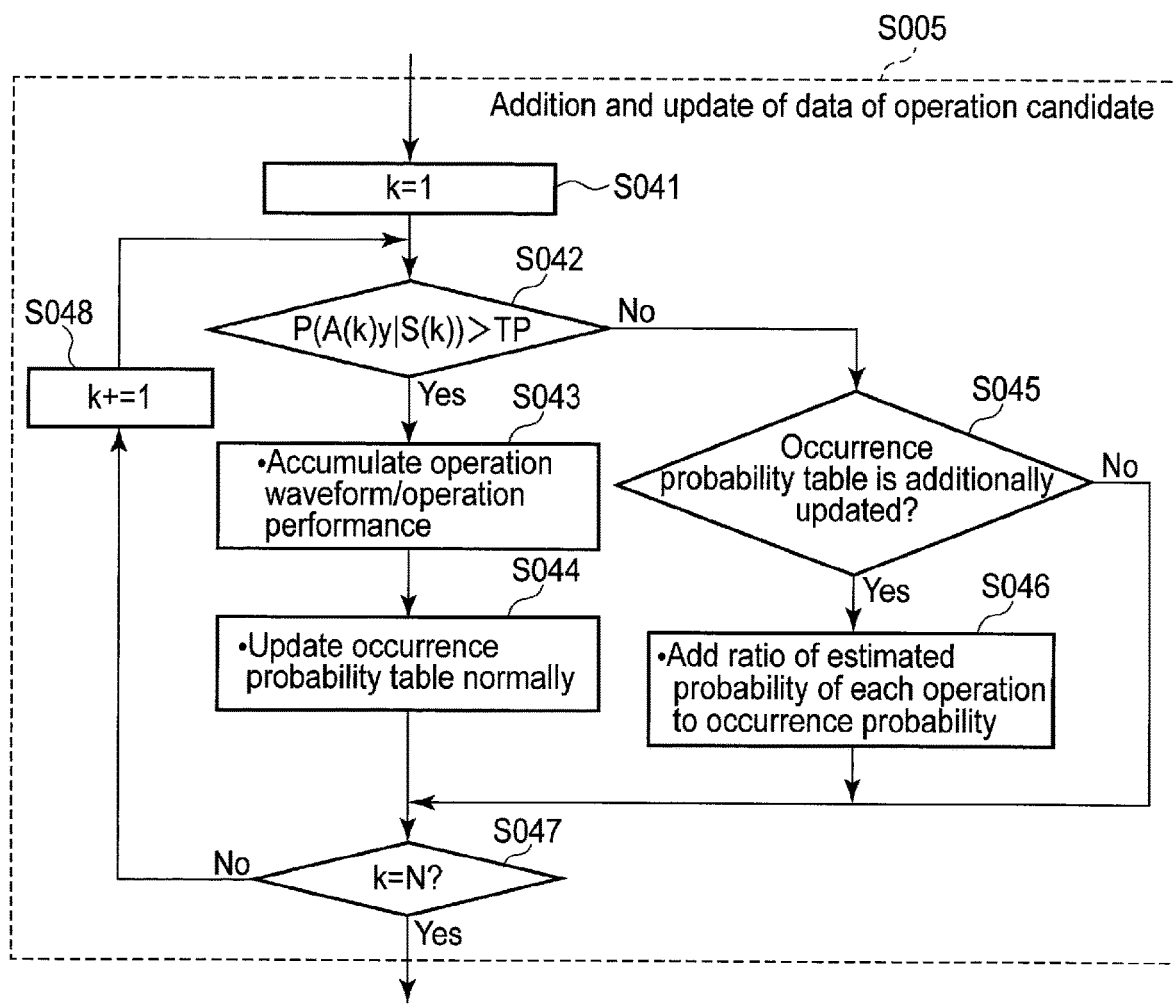
FIG. 19 is a flowchart showing a flow of a reference data updating process.

FIG. 19 shows a detailed flow in an additional update process S005 of operation estimating reference data in the "process of collecting data of operation candidates (model operations)" described with reference to FIG. 1A. As has already been described, the reference data is not limited to the operation waveform (reference acceleration data), operation performance or occurrence probability table, but may include a feature amount (average, variance, frequency) for each model operation (operation candidate). This reference data may be updated sequentially each time the estimated operation B(k) in the time interval whose number is equal to k is specified and stored appropriately in the operation waveform data storage unit 34 or the operation performance storage unit 40.

The basic idea described with reference to FIG. 19 is as follows. When P(A(k)y|S(k)) is larger than TP (S042), the accuracy of the estimated operation is considered to be high, and the acquired acceleration data 12 is added S005 as part of the reference acceleration data in correspondence with the estimated result (estimated operation 16). This added data is stored in the operation waveform data storage unit 34 shown in FIG. 3A. At the same time, the obtained estimated result (estimated operation 16) is accumulated as operation performance and the occurrence probability table is updated (S005). These data items are added and updated to the operation performance storage unit 40.

On the other hand, when P(A(k)y|S(k)) is equal to or smaller than TP (S042), the accuracy of the estimated operation is considered to be low. In this case, the acquired acceleration data 12 is not additionally stored in the operation waveform data storage unit 34. With respect to the data stored in the operation performance storage unit 40, a method for processing the data is varied based upon the contents preset by the user (S045).

That is, in this case, the user determines in advance in S045 whether to add and update the occurrence probability table of the operation transition. If the user does not add or update the occurrence probability table, no data is added or updated to the operation performance storage unit 40, like the acquired acceleration data 12.

When the occurrence probability table of the operation transition is added and updated in S045, the estimated probability of each model operation (operation candidate) is fed back to the occurrence probability table.

The foregoing basic idea will be described along the flow of the update process shown in FIG. 19. The determination process of S042 in FIG. 19 has the same contents as those of the determination process S023 described with reference to FIG. 11. That is, the magnitude of the estimated probability of the estimated operation A(k)y corresponding to the maximum value of the estimated probability indicated in S022 of FIG. 11 and that of the threshold value TP are compared.

When P(A(k)y|S(k)) is larger than TP (S042), the activity meter data (acquired acceleration data) in the time interval whose number is equal to k is additionally stored in the operation waveform data storage unit 34 in association with the estimated operation A(k)y of the maximum estimated probability (FIG. 3A). Then, the activity meter data (acquired acceleration data) is utilized as part of the reference acceleration data (S043). In parallel with it, the feature amounts (average, variance, frequency) of the activity meter data (acquired acceleration data) may be stored in the operation performance storage unit 40 to update the feature amount of model operation using these feature amounts (S043).

Furthermore, the occurrence probability table (and the occurrence frequency table) at which the combination of estimated operations of adjacent two time interval numbers occurs is updated and stored in the operation performance storage unit 40 shown in FIG. 3A (S044). As a specific method of updating the occurrence frequency table, for example, "1" is added to a point corresponding to the estimated operation A(k)y in the operation Y(k) shifted in the occurrence frequency table ((b) in FIG. 20). The foregoing contents will specifically be described using the example of FIG. 12. In the time interval whose number is equal to 3, operation A corresponds to the estimated operation A(4)y. In the time interval whose number is equal to 4, operation C corresponds to the estimated operation A(4)y. Therefore, the value of the intersection of a column corresponding to the operation "C" in the shifted operation Y(k) 84 in FIG. 20(b) and a row corresponding to operation A in the operation X(k-1) 82 which has not been shifted (the point described as "2" in FIG. 20(b)) is incremented to "3".

When P(A(k)y|S(k)) is equal to or smaller than TP (S042) as a result of the comparison, it is determined whether to update the occurrence probability at which the combination of estimated operations of adjacent two time interval numbers occurs (S045). This determination is set/selected by a user who uses the present system.

When it is determined that "the occurrence probability need not be updated", the determination process is terminated without performing any process (S407). On the other hand, when it is determined that "the occurrence needs to be updated", the estimated probability of each model operation in the time interval whose number is equal to k is added to the combination of estimated operations in the time intervals whose numbers are equal to k-1 and k to update the occurrence frequency table and the occurrence probability table (S046).

Figure 20:
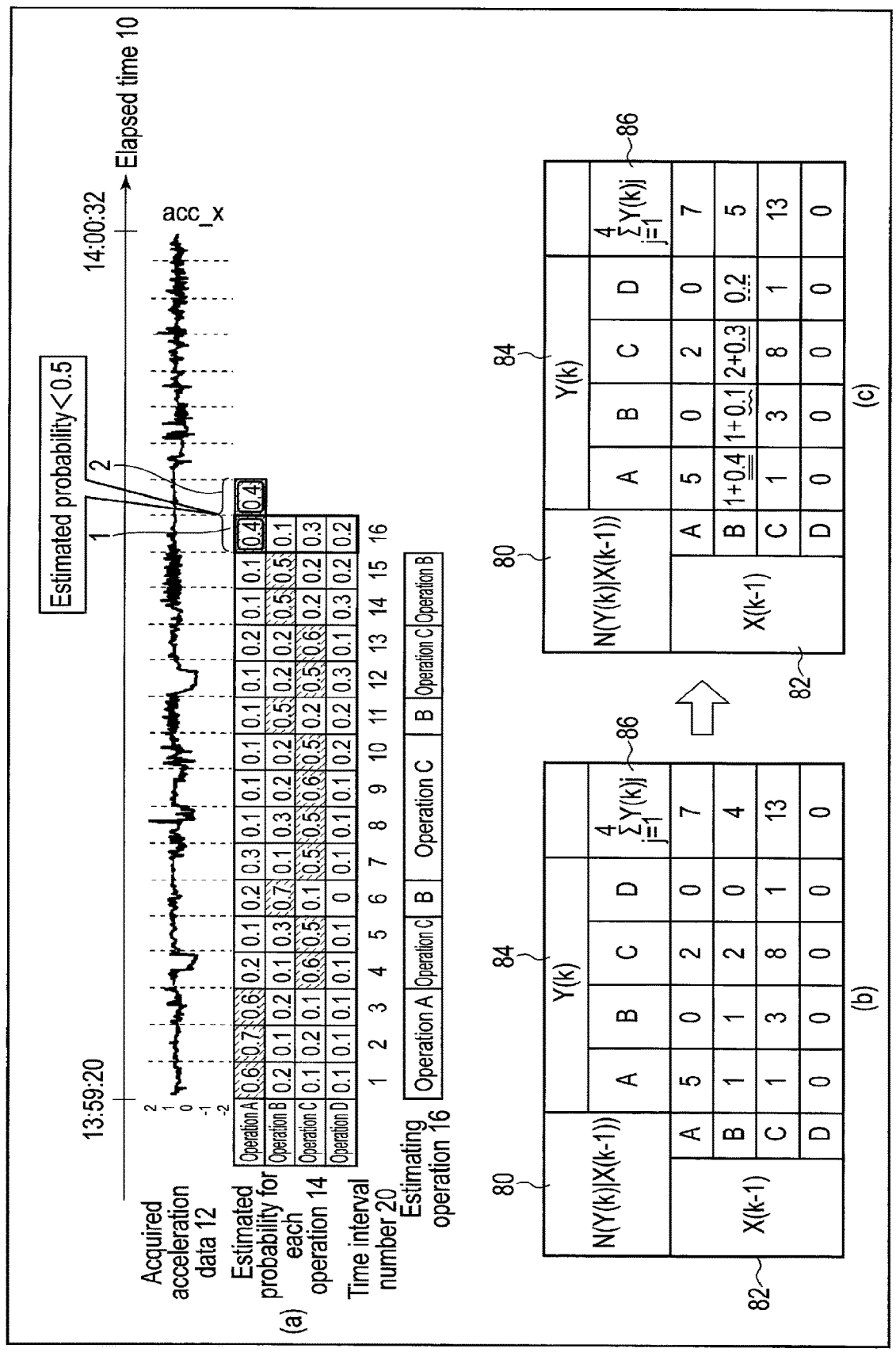
FIG. 20 is a diagram showing another example of an occurrence probability updating method.

FIG. 20 shows a specific content of the method of adding the estimated probability for each operation in FIG. 19 to the occurrence frequency in S046. Pay here attention to the time interval whose number is equal to 16. The estimated probability P(A(16)y|S(16)) corresponding to the estimated operation A(16) in the time interval whose number is equal to 16 is "0.4" as shown in FIG. 20(a).

If the threshold value TP set in S042 of FIG. 19 is set to "0.5", P(A(16)y|S(16)) becomes equal to or smaller than TP as a result of the determination of S042. The process is thus shifted to the process of S046 via the process of S045 in accordance with the determination result (it is assumed that the user updates and selects the occurrence frequency table and the occurrence probability table). At that time, the estimated probability of each estimated operation is added to its corresponding occurrence frequency table.

The above will be described in detail below using a specific example. The occurrence frequency table that has not been updated is shown in FIG. 20(b). As shown in FIG. 20(a), the estimated operation 16 in the time interval whose number is equal to 15 corresponds to operation B. Thus, a row corresponding to the operation B in the operation X(k-1) 82 that has not been shifted, shown in FIG. 20(b) is a target for update.

Therefore, the update of the occurrence frequency table is performed in S046 by adding the estimated probability of each model operation (operation candidate) in the time interval whose number is equal to 16 to the target row. In FIG. 20(a), the values of estimated probabilities 14 of operations in the time interval whose number is equal to 16 are "0.4 in operation A", "0.1 in operation B", "0.3 in operation C" and "0.2 in operation D". The values "0.4", "0.1", "0.3" and "0.2" are added to their respective rows corresponding to the operation X(k-1) 82 that has not been shifted. The occurrences frequency table updated by adding the values of the estimated probabilities 14 is shown in FIG. 20(c).

The occurrence probability table is thus obtained as a result of standardizing the occurrence frequency table in the case of updating by "the total ΣYj86 of the number of times of shift from operation X to each operation Y".

While certain embodiments have been described, these embodiments have been presented by way of example only, and are not intended to limit the scope of the inventions. The embodiments are described particularly with an emphasis on the operating estimation of a person being measured. However, the embodiments are not limited to the operating estimation but may be applied to the state estimation of environment in which, e.g., various sensors are placed.

The novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An operation estimating system to determine a current operation being performed by a worker at a given time, the system comprising:
   a wearable device worn by the worker; and
   a handheld terminal used by the worker while the worker is working,
   the handheld terminal storing work interval data indicating an interval between a start time and an end time of a piece of work and work content data indicating a work content,
   the wearable device comprising an activity meter data collection unit, activity meter data processing unit, and a data memory,
   the activity meter data collection unit comprising an acceleration sensor and being configured to obtain acquired acceleration data as activity meter data from the acceleration sensor,
   the activity meter data processing unit comprising a work interval collation unit, an activity meter data operation identification unit, an activity meter data operation determination unit, and an operation performance totalization unit,
   the data memory comprising an activity meter data memory, an operation waveform data memory, and an operation performance memory,
   the activity meter data memory storing the acquired acceleration data temporarily,
   the operation waveform data memory storing in advance reference acceleration data for each model operation,
   the work interval collation unit of the activity meter data processing unit setting a work interval, using the acquired acceleration data read from the activity meter data memory and the work interval data obtained by the handheld terminal,
   the work interval collation unit further transmitting the acquired acceleration data as the activity meter data belonging to the work interval to the activity meter data operation identification unit,
   the activity meter data operation identification unit further dividing the activity meter data of the work interval into a plurality of time intervals and setting chronological time interval numbers on the time intervals,
   the activity meter data operation identification unit further comparing the acquired acceleration data of each time interval with the reference acceleration data for each model operation to calculate estimated probabilities of the model operations for each time interval,
   the activity meter data operation identification unit then selecting a maximum value from the estimated probabilities of the model operations to define the maximum value as an estimated operation of the model operations for each time interval,
   the activity meter data operation identification unit arranging the estimated operations in order of the time interval numbers, and storing the estimated operations in the operation performance memory,
   the operation performance totalization unit reading an estimated operation (B(k)) stored in the operation performance memory, and calculating a number of continuous transitions of estimated operations (B(k) and B(k-1)) of adjacent two time interval numbers for each model operation,
   the operation performance totalization unit then generating occurrence frequency data for each model operation using the number of continuous transitions for each model operation, and calculating an occurrence probability based on the occurrence frequency data,
   the operation performance totalization unit storing the occurrence frequency data and the occurrence probability in the operation performance memory,
   the activity meter data operation determination unit then determining whether or not to correct an estimated operation (A(k)y),
   the activity meter data operation determination unit reading the estimated operations of the time intervals stored in the operation performance memory, and comparing an estimated probability (P(A(k)y|S(k))) corresponding to the estimated operation (A(k)y) with a predetermined threshold value,
   the activity meter data operation determination unit when the estimated probability (P(A(k)y|S(k))) is larger than the threshold value, at least maintaining the estimated operation (A(k)y),
   the activity meter data operation determination unit, when the estimated probability (P(A(k)y|S(k))) is equal to or smaller than the threshold value, multiplying the occurrence probability (P(A(k)z|A(k-1)x)) of the corresponding time interval by the estimated probability (P(A(k)y|S(k))) to obtain a multiplication result,
   the activity meter data operation determination unit, when the multiplication result is larger than the threshold value, correcting the estimated operation (A(k)y) to an estimated operation (A(k)z), and
   one of the estimated operation (A(k)y) and (A(k)z) is output as the current operation being performed by the worker.

2. The operation estimating system of claim 1, further comprising a server,
   wherein the server is provided with a second warehouse management system data memory, a second activity meter data processing unit, and a second data memory, and
   the second activity meter data processing unit and the second data memory store processing data from a plurality of wearable devices.

3. The operation estimating system of claim 1, wherein when the estimated operations of the time intervals stored in the operation performance memory are read to compare the estimated probability (P(A(k)y|S(k))) corresponding to the estimated operation (A(k)y) with the predetermined threshold value, and the estimated probability (P(A(k)y|S(k))) is larger than the threshold value,
   the acquired acceleration data is additionally accumulated in the operation waveform data memory.

4. The operation estimating system of claim 1, wherein when the maximum value of the estimated probabilities is higher than a predetermined value, the estimated operation is added to the occurrence frequency.

* * * * *